US008489260B2

(12) United States Patent
Acikmese et al.

(10) Patent No.: US 8,489,260 B2
(45) Date of Patent: Jul. 16, 2013

(54) METHOD AND APPARATUS FOR POWERED DESCENT GUIDANCE

(75) Inventors: Behcet Acikmese, Altadena, CA (US); James C. L. Blackmore, Los Angeles, CA (US); Daniel P. Scharf, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 691 days.

(21) Appl. No.: 12/639,874

(22) Filed: Dec. 16, 2009

(65) Prior Publication Data

US 2010/0228409 A1    Sep. 9, 2010

Related U.S. Application Data

(60) Provisional application No. 61/201,866, filed on Dec. 16, 2008, provisional application No. 61/164,338, filed on Mar. 27, 2009, provisional application No. 61/183,508, filed on Jun. 2, 2009, provisional application No. 61/286,095, filed on Dec. 14, 2009.

(51) Int. Cl.
*B64G 1/36* (2006.01)
*B64G 1/24* (2006.01)
*G05D 1/06* (2006.01)
*G05D 1/08* (2006.01)
*G06F 19/00* (2006.01)

(52) U.S. Cl.
USPC ............. 701/16; 701/3; 701/4; 701/5; 701/6; 701/13; 701/18

(58) Field of Classification Search
USPC .................. 701/3, 4, 5, 6, 7, 8, 9, 10, 11, 12, 701/13, 14, 16, 18, 23, 26
See application file for complete search history.

(56) References Cited

U.S. PATENT DOCUMENTS 4,445,653 A * 5/1984 Schwaerzler ............. 244/110 D
2008/0023587 A1 * 1/2008 Head et al. ................. 244/158.4

OTHER PUBLICATIONS

Scott R. Ploen and Behcet Acikmese, Convex Programming Approach to Powered Descent Guidance for Mars Landing, Sep.-Oct. 2007, Journal of Guidance, Control, and Dynamics, vol. 30, No. 5, pp. 1353 thru 1366.*
Acikmese et al., "A Powered Descent Guidance Algorithm for Mars Pinpoint Landing," AIAA Guidance, Navigation, and Control Conference, San Francisco, CA, Aug. 15-18, 2005, pp. 1-17.
Acikmese, et al., "Convex Programming Approach to Powered Descent Guidance for Mars Landing," AIAA Journal of Guidance, Control and Dynamics, vol. 30, No. 5; 2007, pp. 1353-1366.
Acikmese, et al., "Enhancements on the Convex Programming Based Powered Descent Guidance Algorithm for Mars Landing," Proceedings of the AIAA Guidance, Navigation and Control Conference 2008, Aug. 18-21, 2008, 16 pages.

(Continued)

*Primary Examiner* — Thomas Black
*Assistant Examiner* — Dale W Hilgendorf
(74) *Attorney, Agent, or Firm* — Gates & Cooper LLP

(57) ABSTRACT

A method and apparatus for landing a spacecraft having thrusters with non-convex constraints is described. The method first computes a solution to a minimum error landing problem for a convexified constraints, then applies that solution to a minimum fuel landing problem for convexified constraints. The result is a solution that is a minimum error and minimum fuel solution that is also a feasible solution to the analogous system with non-convex thruster constraints.

12 Claims, 12 Drawing Sheets

OTHER PUBLICATIONS

Arvidson et al., "Mars Exploration Program 2007 Phoenix landing site selection and characteristics," Journal of Geophysical Research, vol. 113, 2008, pp. 1-14.

Blackmore et al., "Minimum-Landing-Error Powered-Descent Guidance for Mars Landing Using Convex Optimization". Journal of Guidance, Control and Dynamics, vol. 33, No. 4, Jul.-Aug. 2010, pp. 1161-1171.

D'Souza, "An Optimal Guidance Law for Planetary Landing," Proceedings of the AIAA Guidance, Navigation and Control Conference 1997, pp. 1376-1381.

Fahroo, et al., "Direct Trajectory Optimization by a Chebyshev Pseudospectral Method," Journal of Guidance, Control, and Dynamics, vol. 25, No. 1, 2002, pp. 160-166.

Klumpp, "Apollo Lunar Descent Guidance." Automatica, vol. 10, 1974, pp. 133-146.

Knocke et al., "Mars Exploration Rovers Landing Dispersion Analysis." Proceedings of the AIAA/AAS Astrodynamics Specialist Conference, 2004, pp. 1-17.

Meditch, "On the Problem of Optimal Thrust Programming for a Lunar Soft Landing," IEEE Transactions on Automatic Control, vol. AC-9, No. 4, 1964, pp. 477-484.

Najson et al., "A Computationally Non-expensive Guidance Algorithm for Fuel Efficient Soft Landing," AIAA Guidance, Navigation, and Control Conference, San Francisco, CA, Aug. 15-18, 2005, pp. 1-15.

Ploen et al., "A Comparison of Powered Descent Guidance Laws for Mars Pinpoint Landing," AIAA Guidance, Navigation, and Control Conference, Keystone, CO, Aug. 21-24, 2006, pp. 1-16.

Sostaric et al., "Powered Descent Guidance Methods for the Moon and Mars," AIAA Guidance, Navigation, and Control Conference, San Francisco, CA, Aug. 15-18, 2005, pp. 1-20.

Steinfeldt et al., "Guidance, Navigation, and Control Technology System Trades for Mars Pinpoint Landing," Proceedings of the AIAA Guidance, Navigation and Control Conference 2008, Aug. 18-21, 2008, pp. 1-16.

Sturm, "Using SeDuMi 1.02, a MATLAB Toolbox for Optimization Over Symmetric Cones," Department of Economics, Tilburg University, The Netherlands. Aug. 1998-Oct. 2001, pp. 1-30.

Sturm, "Implementation of Interior Point Methods for Mixed Semidefinite and Second Order Cone Optimization Problems," Department of Economics, Tilburg University, The Netherlands. Aug. 2, 2002, pp. 1-41.

Topcu et al., "Fuel Efficient Powered Descent Guidance for Mars landing," AIAA Guidance, Navigation, and Control Conference, San Francisco, CA, Aug. 15-18, 2005, pp. 1-11.

Vandenberghe et al., "Semidefinite Programming," SIAM Review. vol. 38, No. 1. 1995, pp. 49-95.

Vlassenbroeck et al., "A Chebyshev Technique for Solving Nonlinear Optimal Control Problems," IEEE Transactions on Automatic Control, vol. 33, No. 4, 1988, pp. 333-340.

Wolf et al., "Performance Trades for Mars pinpoint landing," IEEE Aerospace Conference paper #1661, Version 2, Jan. 9, 2006, pp. 1-16.

\* cited by examiner

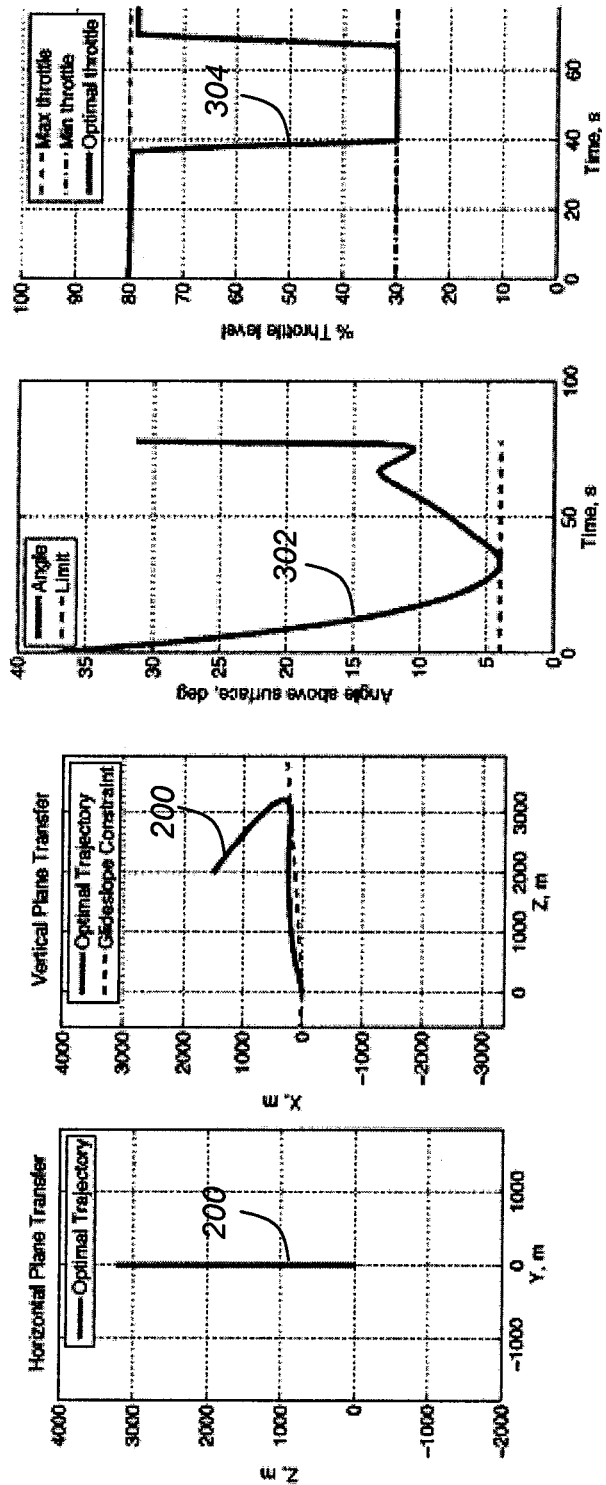

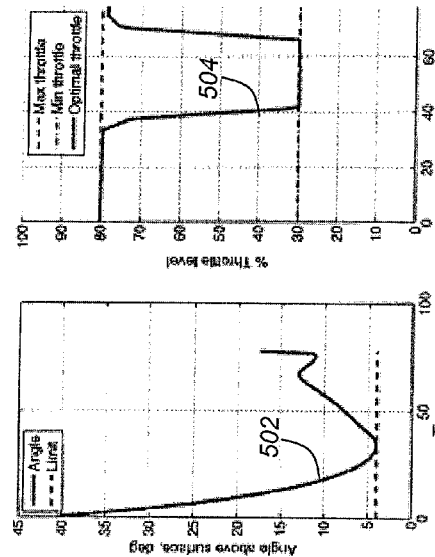
FIG. 5A
FIG. 5B
FIG. 5C
FIG. 5D
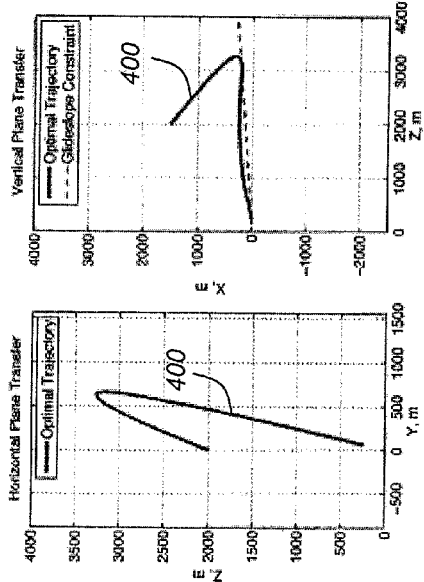
FIG. 5E
FIG. 5F
FIG. 5G
FIG. 5H

METHOD AND APPARATUS FOR POWERED DESCENT GUIDANCE

CROSS-REFERENCE TO RELATED APPLICATIONS

This application claims benefit of the following U.S. Provisional Patent Applications, each of which is incorporated by reference herein:

U.S. Provisional Patent Application No. 61/201,866, entitled "MINIMUM LANDING ERROR POWERED DESCENT GUIDANCE FOR PLANETARY MISSIONS," by James C. Blackmore and Behcet Acikmese, filed Dec. 16, 2008;

U.S. Provisional Patent Application No. 61/164,338, entitled "MINIMUM LANDING ERROR POWERED DESCENT GUIDANCE FOR PLANETARY MISSIONS," by Daniel P. Scharf, James C. Blackmore and Behcet Acikmese, filed Mar. 27, 2009;

U.S. Provisional Patent Application No. 61/183,508, entitled "A TABLE LOOKUP SOLUTION ALGORITHM OF THE OPTIMAL POWERED DESCENT GUIDANCE PROBLEM FOR PLANETARY LANDING," by James C. Blackmore, and Behcet Acikmese, filed Jun. 2, 2009; and U.S. Provisional Patent Application No. 61/286,095, entitled "MINIMUM LANDING ERROR POWERED DESCENT GUIDANCE FOR MARS LANDING USING CONVEX OPTIMIZATION," by James C. Blackmore, Behcet Acikmese, and Daniel P. Scharf, filed Dec. 14, 2009.

STATEMENT OF RIGHTS OWNED

The invention described herein was made in the performance of work under a NASA contract, and is subject to the provisions of Public Law 96-517 (35 U.S.C. §202) in which the Contractor has elected to retain title.

BACKGROUND OF THE INVENTION

1. Field of the Invention

The present invention relates to systems and methods for guiding spacecraft, and in particular to a system and method for guiding a spacecraft to a soft landing on a planetary surface.

2. Description of the Related Art

To increase the science return of future missions to Mars, and to enable sample return missions, the accuracy with which a lander can be delivered to the Martian surface must be improved by orders of magnitude over the current capabilities. Towards this goal, our prior work developed a convex optimization based minimum-fuel powered descent guidance algorithm. Here, we extend this approach to handle the case when no feasible trajectory to the target exists. In this case, our objective is to generate the minimum landing error trajectory, which is the trajectory that minimizes the distance to the prescribed target while utilizing the available fuel optimally. This problem is inherently a non-convex optimal control problem due to a nonzero lower bound on the magnitude of the feasible thrust vector. We first prove that an optimal solution of a convex relaxation of the optimal control problem is also optimal for the original non-convex problem, which we refer to as the lossless convexification of the original non-convex problem. Then we show that the minimum landing error trajectory generation problem can be posed as a convex optimization problem, in particular as a Second-Order Cone Program, and solved to global optimality with deterministic convergence. This makes the approach amenable to onboard implementation for real-time applications.

SUMMARY OF THE INVENTION

To address the requirements described above, the present invention discloses a method and apparatus for computing a thrust profile to land a spacecraft at or near a surface target, wherein the spacecraft is subject to a non-convex thrust constraint. In one embodiment, the method comprises the steps of computing a minimum landing error descent solution for the spacecraft subject to a convexified non-convex constraint, wherein the descent solution includes a landing error, and determining the thrust profile for the spacecraft subject to the non-convex constraint from the computed minimum landing error descent solution for the spacecraft subject to the convexified non-convex constraint, and commanding the spacecraft thrusters according to the thrust profile. In a further embodiment, the step of determining the thrust profile for the spacecraft subject to the non-convex constraint from the computed minimum landing error descent solution for the spacecraft subject to the convexified non-convex constraint comprises the steps of computing a minimum fuel descent solution for the spacecraft subject to the convexified non-convex constraint and the landing error, and determining the thrust profile for the spacecraft subject to the non-convex constraint from the computed minimum fuel descent solution for the spacecraft subject to the convexified non-convex constraint.

In a still further embodiment, the apparatus comprises a processor for computing a minimum landing error descent solution, comprising a memory for storing instructions including instructions for computing a minimum landing error descent solution for the spacecraft subject to a convexified non-convex constraint, wherein the descent solution includes a landing error, and for determining the thrust profile for the spacecraft subject to the non-convex constraint from the computed minimum landing error descent solution for the spacecraft subject to the convexified non-convex constraint, and for commanding the spacecraft thrusters according to the thrust profile. The apparatus further comprises thrusters for applying the commanded thrust to the spacecraft.

BRIEF DESCRIPTION OF THE DRAWINGS

Referring now to the drawings in which like reference numbers represent corresponding parts throughout:

FIGS. 3A-3H are diagrams presenting the result of the minimum landing error targeting approach for the initial conditions described with respect to FIG. 2.

FIGS. 5A-5H are diagrams presenting the result of the minimum landing error targeting approach for the initial conditions described with respect to FIG. 4.

DETAILED DESCRIPTION OF PREFERRED EMBODIMENTS

Figure 1:
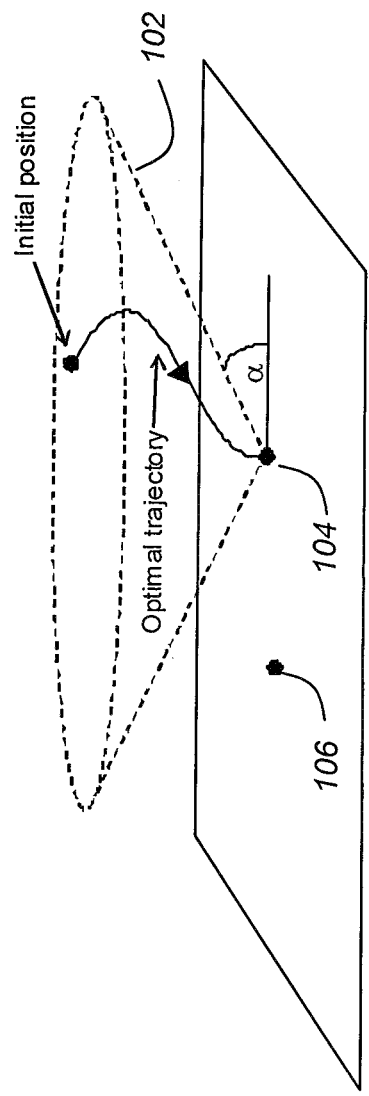
FIG. 1 is a diagram illustrating glideslope constraints for a minimum landing error powered descent. The glideslope constraint requires the spacecraft to remain in a cone defined by a minimum slope angle $\alpha$. In a minimum landing error case, the apex of the cone coincides with the landed position of the spacecraft, rather than the original target.

In the following description, reference is made to the accompanying drawings which form a part hereof, and which is shown, by way of illustration, several embodiments of the present invention. It is understood that other embodiments may be utilized and structural changes may be made without departing from the scope of the present invention.

I. Introduction (Note: This application references a number of different publications as indicated throughout the specification by reference numbers enclosed in brackets, e.g., [x] or the words "Ref." or "Refs.". A list of these different publications ordered according to these reference numbers can be found below in the section entitled "References." Each of these publications is incorporated by reference herein.)

The science return of previous missions to the surface of Mars has been limited by the accuracy with which a lander can be delivered to the surface. Landing accuracy is characterized by the 3-sigma landing ellipse, which defines the region around the target in which landing can be guaranteed. The size of this ellipse (major axis) was approximately 150 km for Mars Pathfinder and 35 km for the Mars Exploration Rovers. The 2009 Mars Science Laboratory mission aims to achieve a landing ellipse of around 10 km. This means that landing site selection is driven by the need to find a safe landing site, rather than by science goals. In other words, landing sites must be large, flat, and relatively rock- and crater-free areas to ensure safe landing. These regions are usually not the sites with the maximum science return. For example, in the recent Phoenix mission, orbital images taken months before the landing showed a higher-than-expected concentration of large rocks at the primary landing site. This required a switch to an alternate landing site, which may not have been necessary if a more accurate landing were possible.

Accurate landing is also an enabling technology for Mars sample return missions. One concept for such a mission would involve a first spacecraft gathering samples, with a second spacecraft arriving at Mars later to return the sample to Earth. For this to be possible, the second spacecraft has to land close to the first in order to enable transfer of the sample without prohibitively high power and mobility requirements. Achieving this with a sufficiently low level of risk to the mission will require dramatic improvements in landing accuracy.

Recent work has focused on achieving pinpoint landing, which is defined as landing to within hundreds of meters of a target. The pinpoint landing concept consists of an entry phase through the Martian atmosphere, during which bank angle control is used to target the spacecraft, followed by parachute deployment. During the parachute phase, errors accumulate due to winds and atmospheric uncertainty. Once the parachute is released, the final powered descent phase then uses thrusters to land safely at the target. To do so, the lander needs to calculate onboard a trajectory from its a priori unknown location at parachute cutoff to the target. This powered descent guidance (PDG) problem is challenging for a number of reasons. First, we must guarantee that any feasible solution obeys hard constraints, including minimum and maximum thrust magnitudes and a minimum glideslope angle. The latter constraint also prevents subsurface flight. Second, we must guarantee that a feasible solution will be found in a matter of seconds. This requirement is derived from the duration of the parachute and PDG phases; if the PDG algorithm takes too long to find a feasible solution, the lander can crash into the surface. Third, to both maximize the distance from which the lander can reach the target and minimize the amount of fuel that must be carried onboard, the algorithm should find the globally optimal solution.

A great deal of prior work has developed approximate solutions to the powered descent guidance problem Ref. 2, and Refs. 5-10. The convex optimization approach poses the problem of minimum-fuel powered descent guidance as a Second-Order Cone Program (SOCP). This optimization problem can be solved in polynomial time using existing algorithms that have a deterministic stopping criterion given a prescribed level of accuracy. That is, the global optimum can be computed to any given accuracy with a deterministic upper bound on the number of iterations required for convergence. This is in contrast with other approaches that either compute a closed-form solution by ignoring the constraints of the problem, propose solving a nonlinear optimization onboard, or solve a related problem that does not minimize fuel use. The closed-form solution approach results in solutions that do not obey the constraints inherent in the problem, such as no subsurface flight constraints; in practice this reduces the size of the region from which return to the target is possible by a factor of ten or more.

Nonlinear optimization approaches, on the other hand, cannot provide deterministic guarantees on how many iterations will be required to find a feasible trajectory, and are not guaranteed to find the global optimum. This limits their relevance to onboard applications. For more extensive comparisons of the convex optimization approach to alternative approaches, see Refs. 10 and 14.

We extend the convex optimization approach of Ref. 2 to handle the case when no feasible trajectory to the target exists. If no feasible trajectory to the target exists, the onboard guidance algorithm must ensure that a safe landing occurs as close as possible to the original target, if necessary using all of the fuel available for powered descent guidance. In this paper we present an algorithm that solves this minimum landing error problem. The algorithm calculates the minimum-fuel trajectory to the target if one exists, and calculates the trajectory that minimizes the landing error if no solution to the target exists. In the spirit of Ref. 2, the approach poses the problem as two Second-Order Cone Programs, which can be solved to global optimality with deterministic bounds on the number of iterations required. This minimum landing error capability will be necessary for missions that want to increase landing accuracy, but cannot carry enough fuel to ensure that the target can be reached in all possible scenarios. In addition the capability will enable safe landing as a contingency in the case where when the position and velocity of the lander at parachute cutoff is outside of the range of values anticipated during mission design. Causes of this misprediction include higher-than-expected winds or atmospheric parameters, such as atmospheric density, being outside of the modeled values. Since there remains a great deal of uncertainty in atmospheric models, this possibility should be considered in the mission design.

The key difficulty in posing the minimum landing error problem as a convex optimization problem is the presence of non-convex constraints, namely the nonlinear system dynamics and the non-convex thrust constraints. The thrust constraints are non-convex because of a minimum thrust magnitude constraint, which arises because, once started, the thrusters cannot be throttled below a certain level. In Ref. 2, we rendered the minimum-fuel guidance problem convex by relaxing the non-convex constraints and then proving that any optimal solution of the relaxed problem is also an optimal solution to the full non-convex problem.

We refer to this approach as lossless convexification. The primary theoretic contribution of the present paper is an analogous convexification for the minimum landing error powered descent guidance problem. We pose two optimization problems in which the non-convex constraints have been relaxed to yield Second-Order Cone Programs. We solve these problems sequentially, and then provide a new analytic result that shows that any optimal solution to the second relaxed problem is also an optimal solution to the non-convex minimum landing error problem. This result is then used to develop the algorithm that solves the minimum landing error problem. Furthermore, we show that the solution uses the least fuel of all the optimal solutions to the minimum landing error problem.

This paper is organized as follows: In Section II we review the convex optimization approach of Ref. 2 to solving the minimum-fuel PDG problem before defining the minimum landing error PDG problem in Section III. In Section B we present the main analytic result of the paper, namely the convexification of non-convex control constraints. In Section IV we present the new algorithm for minimum landing error PDG. Section V gives simulation results and Section VI presents our conclusions.

II. Minimum-Fuel Powered Descent Guidance

In this section we review the minimum-fuel powered descent guidance approach of Ref. 2. The minimum-fuel PDG problem consists of finding the thrust profile that takes the lander from an initial position and an initial velocity to rest at the prescribed target location, and minimizes the fuel mass consumed in doing so.

The minimum-fuel PDG problem is defined formally in Problem 1. Throughout this paper we use $e_i$ to denote a column vector of all zeros except the $i^{th}$ row, which is unity. We use to denote the two-norm of the vector. We use a.e. to mean almost everywhere, that is, everywhere except on a set of measure zero.

(Non-convex minimum-fuel guidance problem). Problem 1

$$\max_{t_f, T_c(\cdot)} m(t_f) - m(0) = \min_{t_f, T_c(\cdot)} \int_0^{t_f} \alpha \|T_c(t)\| dt \quad (1)$$

subject to:

$$\ddot{r}(t) = g + T_c(t)/m(t) \quad \dot{m}(t) = -\alpha \|T_c(t)\| \quad (2)$$

$$0 < \rho_1 \leq \|T_c(t)\| \leq \rho_2 \quad (3)$$

-continued $$r(t) \in X \forall t \in [0, t_f] \quad (4)$$

$$m(0) = m_{wet}, m(t_f) \geq m_{dry} \quad (5)$$

$$r(0) = r_0, \dot{r}(0) = \dot{r}_0 \quad (6)$$

$$e_1^T r(t_f) = 0, [e_2 \ e_3]^T r(t_f) = q, \dot{r}(t_f) = 0 \quad (7)$$

Here, $q \in R^2$ defines the location of the landing target on the surface. We use X to define the set of feasible positions of the spacecraft, namely the glide slope constraint:

$$X = \{r \in \mathbb{R} \ R^3 : \|S(r - r(t_f))\| - c^T(r - r(t_f)) \leq 0\}, \quad (8a)$$

where S and c are defined by the user to specify a feasible cone with a vertex at $r(t_f)$:

$$S \triangleq \begin{bmatrix} 0 & 1 & 0 \\ 0 & 0 & 1 \end{bmatrix} \quad c \triangleq e_1 \tan\alpha \quad \alpha > 0.$$

Here $\alpha$ is the minimum glide slope angle, illustrated in FIG. 1. The glide slope constraint (8a) ensures that the trajectory to the target cannot be too shallow and cannot go subsurface. X is a convex set with an interior defined by $$\text{int } X := \{x \in X : \exists r > 0 \text{ such that } \xi \in X \text{ if } \|x - \xi\| < r\}, \quad (9)$$

and the boundary of X is given by $$\partial X := \{x \in X : x \notin \text{int } X\}.$$

The inequalities in (8) ensure that the planned trajectory does not fly below the surface and that general cone constraints on the lander's position are satisfied. These cone constraints are used to specify, for example, minimum glideslope angles; these ensure that the trajectory to the target cannot be too shallow. Equation (5) defines the initial mass of the lander and ensures that no more fuel than available is used. Equation (6) defines the initial position and velocity of the lander, while (7) constrains the lander to be at rest at the target at the final time.

A key challenge in solving Problem 1 consists of the non-convex thrust magnitude constraints in (3). These prevent the direct use of convex optimization techniques in solving this problem. The key theoretical innovation of Ref. 2 is to relax these non-convex constraints to give the following problem and to show that the optimal solution of this relaxed problem is also an optimal solution of Problem 1:

(Relaxed minimum-fuel guidance problem). Problem 2

$$\min_{t_f, T_c(\cdot), \Gamma(\cdot)} \int_0^{t_f} \Gamma(t) dt \quad (10)$$

subject to:

$$\ddot{r}(t) = g + T_c(t)/m(t) \quad \dot{m}(t) = -\alpha \Gamma(t) \quad (11)$$

$$\|T_c(t)\| \leq \Gamma(t) \quad 0 < \rho_1 \leq \Gamma(t) \leq \rho_2 \quad (12)$$

$$r(t) \in X \forall t \in [0, t_f] \quad (13)$$

$$m(0) = m_{wet}, m(t_f) \geq m_{dry} \quad (14)$$

$$r(0) = r_0, \dot{r}(0) = \dot{r}_0 \quad (15)$$

$$e_1^T r(t_f) = 0, [e_2 \ e_3]^T r(t_f) = q, \dot{r}(t_f) = 0 \quad (16)$$

Note that the non-convex thrust constraints in Equation (3) have been replaced with convex set of constraints (Eq. 12). In Ref. 2 we showed that this constraint relaxation allows the discrete-time form of Problem 2 to be posed as a convex optimization problem. Furthermore, the following lemma formally states that an optimal solution to the relaxed minimum-fuel problem is also an optimal solution to the full, non-convex minimum-fuel PDG problem.

Lemma 1.

Let $\{t_f^*, T_c(\bullet), \Gamma^*(t)\}$ be an optimal solution to Problem 2 such that the corresponding state trajectory $r^*(t)$ is on the boundary of the state constraints $\partial X$ for at most one point on $t \in [0, t_f^*]$. Then, $\{t_f^*, T_c(\bullet)\}$ is an optimal solution to Problem 1.

Proof of Lemma 1 is provided in the documents: Acikmese, B. and Ploen, S. R., "Convex Programming Approach to Powered Descent Guidance for Mars Landing," AIAA Journal of Guidance, Control and Dynamics, Vol. 30, No. 5; 2007, pp. 1353-1366 and Blackmore, L., and Acikmese, B., "Minimum Landing Error Powered Descent Guidance for Mars Landing using Convex Optimization" Under Review. Journal of Guidance, Control, and Dynamics, 2009, which are hereby incorporated by reference herein. Specifically, "Convex Programming Approach to Powered Descent Guidance for Mars Landing," provides a proof of Lemma 1 when the optimal state trajectory is strictly in the interior of the state constraints, while "Minimum Landing Error Powered Descent Guidance for Mars Landing using Convex Optimization" extends this to cases where there is contact with the boundary of the state constraints.

The approach of Ref. 2 solves the non-convex minimum-fuel PDG problem by solving a relaxed, convex version of the problem, which is a convex optimization problem. The convexification is lossless, in the sense that no part of the feasible space of the original problem is removed in the convexification process. The resulting optimization problem is a Second-Order Cone Program, for which solution techniques exist that guarantee the globally optimal solution can be found to a certain accuracy within a deterministic number of iterations. However, if a feasible solution does not exist, the optimization will simply report "infeasible," even though it may still be possible to land safely at some distance from the original target. In the next sections, therefore, we extend the approach of Ref. 2 to solve the minimum landing error problem.

III. Minimum Landing Error Powered Descent Guidance Problem Statement

FIG. 1 is a diagram illustrating glideslope constraints for a minimum landing error powered descent. The glideslope constraint requires the spacecraft to remain in a cone 102 defined by a minimum slope angle $\alpha$. In a minimum landing error case, the apex 104 of the cone 102 coincides with the landed position 104 of the spacecraft, rather than the original target 106.

The minimum landing error powered descent guidance problem consists of minimizing the final distance from the target subject to non-convex thrust magnitude constraints and glideslope constraints, while ensuring that no more fuel mass is used than is available. The problem is stated formally in Problem 3. below (Non-convex minimum landing error guidance problem).    Problem 3

$$\min_{t_f, T_c(\cdot)} \|r(t_f)\|^2 \qquad (17)$$

subject to:

$$\ddot{r}(t) = g + T_c(t)/m(t) \;\; \dot{m}(t) = -\alpha \|T_c(t)\| \qquad (18)$$

-continued $$0 < \rho_1 \leq \|T_c(t)\| \leq \rho_2 \qquad (19)$$

$$r(t) \in X \; \forall \; t \in [0, t_f] \qquad (20)$$

$$m(0) = m_{wet}, \; m(t_f) \geq m_{dry} \qquad (21)$$

$$r(0) = r_0, \; \dot{r}(0) = \dot{r}_0 \qquad (22)$$

$$r(t_f)^T e_1 = 0, \; \dot{r}(t_f) = 0 \qquad (23)$$

There are a number of key differences between this and the minimum-fuel guidance problem (Problem 1). First, the cost in Problem 3 is now the squared Euclidean distance from the target at the final time. Minimizing the squared distance is equivalent to minimizing the distance itself, since $\|r(t_f)\| \geq 0$ and $x^2$ is monotonic for $x \geq 0$.}. To simplify notation we have assumed that the target is at zero, without loss of generality. Second, the final position is no longer required to be at the goal as in (7). Instead, (23) constrains the final altitude to be zero and the final velocity to be zero. Note that the cone constraints in (8) are defined around the state at the final time step, and not around the origin. This allows glideslope constraints to be imposed even in the case that it is not possible to reach the target, as illustrated in FIG. 1.

Once again, the key difficulty in solving Problem 3 is that the thrust constraints (19) are non-convex. The approach of Ref. 2 suggests that we overcome this problem through a similar convexification of the thrust constraints. Unfortunately, the result in Lemma 1 does not apply to Problem 3. This means that we are not guaranteed that an optimal solution to a convexified relaxation of the minimum landing error problem is an optimal solution to the minimum landing error problem. In Section IV we therefore propose a new convexification for minimum landing error powered descent guidance.

IV. Minimum Landing Error Powered Descent Guidance Technique

In this section we present a new technique for minimum landing error powered descent guidance. In Section W-A we present the algorithm. In Section IV-B we present a corresponding proof that the algorithm returns the globally optimal solution to Problem 3 if a solution exists.

A. Description

In this section we describe the main algorithm for the solution of the minimum landing error powered descent problem (Problem 3). The key idea is to perform a prioritized optimization such that, first, the distance between the prescribed target and the achievable landing location is minimized by solving Problem 4. Then a minimum fuel trajectory achieving this minimum landing error is generated by solving a slightly modified version of Problem 5. As we show in Section IV-B, this approach ensures that the resulting trajectory satisfies non-convex thrust constraints and returns the globally optimal solution to Problem 3 if one exists. The new algorithm is given in Table 1.

TABLE 1

| Prioritized Powered Descent Guidance Algorithm |
|---|
| Prioritized Powered Descent Guidance Algorithm |
| 1) Solve the relaxed minimum landing error guidance problem (Problem 4) for $\{t_f^*, T_c^*(\cdot), \Gamma^*(\cdot)\}$ with corresponding trajectory $r^*(\cdot)$. If no solution exists, return infeasi le |
| 2) Solve the relaxed minimum-fuel guidance problem to specified range (Problem 5) with $D = \|r(t_f^*)\|$ for $\{t_f^\dagger, T_c^\dagger(\cdot), \Gamma^\dagger(\cdot)\}$. |
| 3) Return $\{t_f^\dagger, T_c^\dagger(\cdot)\}$. |

(Relaxed minimum landing error guidance problem).  Problem 4

$$\min_{t_f, T_c(\cdot), \Gamma(\cdot)} \|r(t_f)\|^2 \quad (24)$$

subject to:

$$\ddot{r}(t) = g + T_c(t)/m(t) \quad \dot{m}(t) = -\alpha \Gamma(t) \quad (25)$$

$$\|T_c(t)\| \leq \Gamma(t) \quad 0 < \rho_1 \leq \Gamma(t) \leq \rho_2 \quad (26)$$

$$r(t) \in X \, \forall \, t \in [0, t_f] \quad (27)$$

$$m(0) = m_{wet}, m(t_f) \geq m_{dry} \quad (28)$$

$$r(0) = r_0, \dot{r}(0) = \dot{r}_0 \quad (29)$$

$$r(t_f)^T e_1 = 0, \dot{r}(t_f) = 0 \quad (30)$$

(Relaxed minimum-fuel guidance problem to specified range).  Problem 5

$$\min_{t_f, T_c(\cdot), \Gamma(\cdot)} \int_0^{t_f} \Gamma(t) dt \quad (31)$$

subject to:

$$\ddot{r}(t) = g + T_c(t)/m(t) \quad \dot{m}(t) = -\alpha \Gamma(t) \quad (32)$$

$$\|T_c(t)\| \leq \Gamma(t) \quad 0 < \rho_1 \leq \Gamma(t) \leq \rho_2 \quad (33)$$

$$r(t)^T e_1 \geq 0 \, \forall \, t \in [0, t_f] \quad (34)$$

$$r(t) \in X \, \forall \, t \in [0, t_f] \quad (35)$$

$$m(0) = m_{wet}, m(t_f) \geq m_{dry} \quad (36)$$

$$r(0) = r_0, \dot{r}(0) = \dot{r}_0 \quad (37)$$

$$r(t_f)^T e_1 = 0, \|r(t_f)\| \leq D, \dot{r}(t_f) = 0 \quad (38)$$

To generate Problem 4 we relaxed the non-convex thrust constraints of the original minimum landing-error problem stated in Problem 3. This relaxation is performed in the same manner that the minimum-fuel PDG problem is relaxed from Problem 1 to Problem 2. Since the relaxed minimum landing-error problem (Problem 4) has convex inequality constraints on the state as well as on the controls, it can be solved with existing solvers. However, unlike minimum-fuel PDG, in which an optimal solution to the relaxed Problem 2 is also an optimal, feasible solution to Problem 1, an optimal solution to the relaxed minimum landing-error problem (Problem 4) is not necessarily an optimal, feasible solution to the original minimum landing-error problem, Problem 3. In particular, another step is needed to ensure that the non-convex thrust constraints are satisfied. This step consists of solving Problem 5, which also has relaxed constraints. However, since Problem 5 minimizes fuel use, we can use the result of Lemma 1 to prove that the solution to Problem 5 will satisfy the non-convex thrust constraints of Problem 3. We will show in Section IV-B that the solution to Problem 5 is the optimal solution to Problem 3, and that it uses the minimum possible fuel of all optimal solutions to Problem 3.

In order to solve Problems 4 and 5 in practice, three additional steps are required; first a change of variables to remove the nonlinear (and hence non-convex) dynamic constraints; second, a discretization in time; and third, a line search for the optimal time of flight. For these steps we use an identical approach to Ref. 2, which we review in Sections IV-C through IV-E.

B. Analytic Convexification

In this section we provide two necessary technical lemmas, before proving the main convexification result, which is given in Theorem 1.

Lemma 2:

Assume that an optimal solution to Problem 5 exists, which we denote $\{t_f^5, T_c^5(\cdot), \Gamma^5(\cdot)\}$, which has a corresponding trajectory $r^5(\cdot)$ that is on the boundary $\partial X$ for at most one point on $t \in [0, t_f^5]$. Then $\{t_f^5, T_c^5(\cdot)\}$ is a feasible solution to problem 1 with $q = [e_2 \, e_3]^T r^5(t_f^5)$.

Proof:

We first claim that $\{t_f^5, T_c^5(\Psi), \Gamma^5(\Psi)\}$ is an optimal solution to problem 2 with $q = [e_2 \, e_3]^T r^5(t_f^5)$. The proof of this is by contradiction. Let us assume that there exists a solution $\{t_f^*, T_c^*(\cdot), \Gamma^*(\cdot)\}$ that satisfies the constraints of Problem 2 with $q = [e_2 \, e_3]^T r^5(t_f^5)$, but that also has:

$$\int_0^{t_f} \Gamma^*(t) dt < \int_0^{t_f} \Gamma^5(t) dt. \quad (39)$$

Comparing constraints, we see that $\{t_f^*, T_c^*(\cdot), \Gamma^*(\cdot)\}$ is a feasible solution to Problem 5. Hence $\{t_f^*, T_c^*(\cdot), \Gamma^*(\cdot)\}$ is also a feasible solution with lower cost than the optimal solution $\{t_f^5, T_c^5(\cdot), \Gamma^5(\cdot)\}$, which leads to a contradiction. Hence $\{t_f^5, T_c^5(\cdot), \Gamma^5(\cdot)\}$ is an optimal solution to Problem 2 with $q = [e_2 \, e_3]^T r^5(t_f^5)$. Since $r^5(t)$ is on the boundary $\partial X$ for at most one point on $t \in [0, t_f^5]$, then by Lemma 1, $\{t_f^5, T_c^5(\cdot), \Gamma^5(\cdot)\}$ is a feasible solution to Problem 1 with $q = [e_2 \, e_3]^T r^5(t_f^5)$.

Lemma 3:

Assume that an optimal solution to Problem 4 exists, which we denote $\{t_f^4, T_c^4(\cdot), \Gamma^4(\cdot)\}$, which has a corresponding trajectory $r^4(\cdot)$. Then there exists a feasible, optimal solution to Problem 5 with $D = \|r^4(t_f^4)\|$, which we denote $\{t_f^5, T_c^5(\cdot), \Gamma^5(\cdot)\}$ with corresponding trajectory $r^5(\cdot)$. Assume further that this trajectory is on the boundary $\partial X$ for at most one point on $t \in [0, t_f^5]$. Then $\{t_f^5, T_c^5(\cdot)\}$ is a feasible, optimal solution to Problem 3. Furthermore $\{t_f^5, T_c^5(\cdot)\}$ uses the minimum possible fuel of all optimal solutions to Problem 3.

Proof:

First, note that $\{t_f^{4*}, T_c^{4*}(\cdot), \Gamma^4(\cdot)\}$ is a feasible solution to Problem 5 with $D = \|r^4(t_f^4)\|$ since the only additional constraint in Problem 5 is $\|r(t_f^4)\| \leq D$, and by design, we have $D = \|r^4(t_f^4)\|$. Hence, a feasible solution to problem 5 exists for $D = \|r^4(t_f^4)\|$. Solving this problem, we obtain $\{t_f^5, T_c^5(\cdot), \Gamma^5(\cdot)\}$, and from Lemma 2, we know that $\{t_f^5, T_c^5(\cdot)\}$ is a feasible solution to Problem 1 for $q = [e_2 \, e_3]^T r^5(t_f^5)$. By comparing constraints, we see that any feasible solution to Problem 1 is a feasible solution to Problem 3. Hence, $\{t_f^5, T_c^5(\cdot)\}$ is a feasible solution to Problem 3. This means that:

$$\|r^5(t_f^5)\| \leq \|r^3(t_f^3)\|,$$

Where $r^3(\cdot)$ denotes the trajectory corresponding to the optimal solution to Problem 3. Now since Problem 4 is a relaxation of Problem 3, we know that $\|r^4(t_f^4)\| \leq \|r^3(t_f^3)\|$. Since in Problem 5 we have assigned $D = \|r^4(t_f^4)\|$, we also know that $\|r^5(t_f^5)\| \leq \|r^4(t_f^4)\|$ and hence:

$$\|r^5(t_f^5)\| \leq \|r^3(t_f^3)\|,$$

Combining (40) and (41) we have $\|r^5(t_f^5)\| \leq \|r^3(t_f^3)\|$. Hence the landing error in the optimal solution to Problem 5 is the same as that in a globally optimal solution to Problem 3. We have already shown that $\{t_f^5, T_c^5(\cdot)\}$ is a feasible solution to Problem 3. Hence $\{t_f^5, T_c^5(\cdot)\}$ is an optimal solution to Problem 3.

We now show that $\{t_f^5, T_c^5(\cdot)\}$ uses the minimum possible fuel of all optimal solutions to Problem 3. We know that $\{t_f^5, T_c^5(\bullet)\}$ is an optimal solution to Problem 3. Hence all optimal solutions to Problem 3 have $\|r(t_f)\|=\|r^5(t_f^5)\|\leq\|r^4(t_f^4)\|$. The proof is by contradiction. Assume that there exists an optimal solution $\{t_f^\dagger, T_c^\dagger(\bullet)\}$ to Problem 3 with corresponding trajectory $r^\dagger(\bullet)$ that also has:

$$\int_0^{t_f^\dagger} \|T_c^\dagger(t)\| dt < \int_0^{t_f^5} \|T_c^5(t)\| dt.$$

Comparing constraints, since $\|r^\dagger(t_f^\dagger)\|\leq\|r^4(t_f^4)\|$ we know that $\{t_f^\dagger, T_c^\dagger(\bullet), \Gamma^\dagger(\bullet)\}$ with $\Gamma^\dagger(\bullet) = \|T_c^\dagger(\bullet)\|$ is also a feasible solution to Problem 5 with $D = \|r^4(t_f^4)\|$. From (42) this solution has a lower cost than $\{t_f^5, T_c^5(\bullet)\}$. This leads to a contradiction since $\{t_f^5, T_c^5(\bullet), \Gamma 5^5(\bullet)\}$ is the optimal solution to Problem 5 with $D = \|r^4(t_f^4)\|$. Hence there is no optimal solution to Problem 3 that uses less fuel than $\{t_f^5, T_c^5(\bullet)\}$.

The following theorem is the main result of this paper and it follows from Lemmas 1 through 3.

Theorem 1. If a solution to the non-convex minimum landing error guidance problem (Problem 3) exists, then the prioritized powered descent guidance algorithm returns a solution $\{t_f^\dagger, T_c^\dagger(\bullet)\}$ with trajectory $r^\dagger(\bullet)$. If this trajectory is on the boundary of the state constraints $\theta X$ for at most one point on the interval $[0, t_f^\dagger]$, then it is an optimal solution to Problem 3. Furthermore the returned solution uses the minimal fuel among all optimal solutions of Problem 3.

Proof: Since Problem 4 is a relaxation of Problem 3, we know that if there is a feasible solution to Problem 3, there exists a feasible solution to Problem 4, and the prioritized powered descent guidance will not return infeasible. Then from Lemma 3 we know that $\{t_f^\dagger, T_c^\dagger(\bullet)\}$ is an optimal solution to Problem 3, and that this solution uses the least fuel of all optimal solutions to Problem 3.

Note that Theorem 1 implies that the prioritized powered descent guidance algorithm returns infeasible only if no solution to the non-convex minimum landing error guidance problem (Problem 3) exists. Hence the convexification approach is lossless, in the sense that no part of the feasible region of the original problem is removed by convexifying the non-convex constraints.

Remark 1. As with the minimum fuel powered descent guidance problem we have observed that, for Mars landing, all the optimal trajectories that are generated via solving the relaxed minimum-fuel guidance problem to specified range touch the boundary of the feasible state region at most one time instant.

Hence the prioritized powered descent guidance algorithm has always returned optimal solutions to the original non-convex minimum landing error problem for Mars powered descent guidance. This includes an extensive empirical investigation across the space of feasible initial conditions and system parameters.

Remark 2. Observe that in Step 1 of the prioritized powered descent guidance algorithm, we do not necessarily obtain a fuel-optimal solution, but that Step 2 ensures a fuel-optimal solution is found. In this way the two-step approach is a way of prioritizing a multi-objective optimization problem. This approach is different from the more typical regularization procedure where both distance and fuel costs are combined in a single cost function to ensure that a single optimal solution exists. The prioritization approach removes two of the key problems associated with regularization. First, regularization requires that the relative weights on fuel and distance are chosen, which is usually carried out in an ad-hoc manner. Second, regularized solutions do not necessarily make physical sense. Our approach removes this ambiguity from the problem description and obtains a physically meaningful solution.

C. Change of Variables

In this section we review the change of variables employed by Ref. 2 to remove the non-convex constraints introduced by the nonlinear state dynamics (25). The change of variables leads to Problem 6, presented later in this section, that is a continuous-time optimal control problem with a convex cost and convex constraints. The change of variables is given by:

$$\sigma \triangleq \frac{\Gamma}{m} \tag{43}$$

$$u \triangleq \frac{T_c}{m}$$

$$z \triangleq \ln m.$$

Equation (25) can then be rewritten as:

$$\ddot{r}(t) = u(t) + g, \tag{44}$$

$$\dot{z} = \frac{\dot{m}(t)}{m(t)} = -\alpha\sigma(t). \tag{45}$$

The change of variables therefore yields a set of linear equations for the state dynamics. The control constraints, however are no longer convex. These are now given by:

$$\|u(t)\| \leq \sigma(t) \; \forall t \in [0, t_f] \tag{46}$$

$$\rho_1 e^{-z(t)} \leq \sigma(t) \leq \rho_2 e^{-z(t)} \; \forall t \in [0, t_f]. \tag{47}$$

The approach of Ref. 2 uses a second order cone approximation of the inequalities in (47) that can be readily incorporated into the SOCP solution framework. The left-hand inequality of (47) can be approximated by a second order cone by using the first three terms of the Taylor series expansion of $e^{-z}$, giving:

$$\rho_1 e^{-z_0}\left[1 - (z - z_0) + \frac{(z-z_0)^2}{2}\right] \leq \sigma,$$

where $z_0$ is a given constant. For the right-hand inequality in (47), a linear approximation of $e^{-z}$ is used corresponding to the first two terms of the Taylor series expansion of $e^{-z}$, thereby obtaining:

$$\sigma \leq \rho_2 e^{-z_0}[1-(z-z_0)].$$

A linear approximation must be used, since requiring a variable to be less than a quadratic is non-convex. Letting:

$$\mu_1 \triangleq \rho_1 e^{-z_0}, \quad \mu_2 \triangleq \rho_2 e^{-z_0}, \tag{48}$$

we obtain the following second order cone and linear approximations of (47):

$$\mu_1(t)\left[1 - (z(t) - z_0(t)) + \frac{(z(t)-z_0(t))^2}{2}\right] \leq \tag{49}$$

$$\sigma(t) \leq \mu_2(t)[1 - (z(t) - z_0(t))]$$

$$\forall t \in [0, t_f],$$

where:

$$z_0(t) = \ln(m_{wet} - \alpha \rho_2 t), \quad (50)$$

and $m_{wet}$ is the initial mass of the spacecraft. An approximation of Problem 4 can now be expressed in terms of the new control variables:

(Relaxed minimum landing error problem with changed variables). Problem 6

$$\min_{t_f, T_c(\cdot), \Gamma(\cdot)} \|r(t_f)\|^2 \quad (51)$$

subject to:

$$\ddot{r}(t) = g + u(t) \quad \dot{z}(t) = -\alpha \sigma(t) \quad (52)$$

$$\|u(t)\| \leq \Gamma(t) \quad (53)$$

$$\mu_1(t)\left[1 - (z(t) - z_0(t)) + \frac{(z(t) - z_0(t))^2}{2}\right] \leq \quad (54)$$
$$\sigma(t) \leq \mu_2(t)[1 - (z(t) - z_0(t))]$$

$$r(t) \in X \; \forall \; t \in [0, t_f] \quad (55)$$

$$m(0) = m_{wet}, \; m(t_f) \geq m_{dry} \quad (56)$$

$$r(0) = r_0, \; \dot{r}(0) = \dot{r}_0 \quad (57)$$

$$r(t_f)^T e_1 = 0, \; \dot{r}(t_f) = 0. \quad (58)$$

Problem 6 is an approximation of the relaxed minimum landing error PDG problem (Problem 4) in which the nonlinear equality constraints have been eliminated. Furthermore, Ref. 2 shows that the approximation of the inequalities in (47) given by (49) is generally very accurate for both parts of the inequality, and derives an analytic upper bound on the approximation error. Problem 6 is a continuous-time optimal control problem with convex constraints and a convex cost function. To solve this using a direct optimization approach, a discretization in time is required, which we describe in Section IV-D.

D. Time Discretization

In this section, we apply the discretization of Ref. 2 to Problem 6, and develop a numerical algorithm to solve the resulting discrete version of the problem. The discretization of Problem 6 converts the infinite-dimensional optimization problem to a finite-dimensional one by discretizing the time domain into equal time intervals and imposing the constraints at edges of the timesteps, which we refer to as temporal nodes. Since the constraints are linear or second order cone constraints, the resulting problem is a finite-dimensional SOCP problem that can be efficiently solved by readily available algorithms.

For any given time interval $[0, t_f]$, and time increment, $\Delta t$, the temporal nodes are given as:

$t_k = k\Delta t \; k = 0, \ldots, N$, where $N\Delta t = t_f$. Define a vector of parameters as:

$$\eta = \begin{bmatrix} p_0 \\ \vdots \\ p_M \end{bmatrix}, \quad (59)$$

where $p_j \in \mathbb{R}^4$. We describe the control input, u, and $\sigma$ in terms of these parameters and some prescribed basis functions, $\phi_1(\cdot), \ldots, \phi_M(\cdot)$:

$$\begin{bmatrix} u(t) \\ \sigma(t) \end{bmatrix} = \sum_{j=0}^{M} P_j \phi_j(t) \quad (60)$$

$t \in [0, t_f]$,

Then the solution of the differential equations (44) and (45) at the temporal nodes and the control inputs at the temporal nodes can be expressed in terms of these coefficients:

$$y_k \triangleq \begin{bmatrix} r(t_k) \\ \dot{r}(t_k) \\ z(t_k) \end{bmatrix} = \Phi_k \begin{bmatrix} r_0 \\ \dot{r}_0 \\ \ln m_{wet} \end{bmatrix} + \Lambda_k \begin{bmatrix} g \\ 0 \end{bmatrix} + \Psi_k \eta \quad (61)$$

$k = 1, \ldots, N$ $$\begin{bmatrix} u_k \\ \sigma_k \end{bmatrix} \triangleq \begin{bmatrix} u(t_k) \\ \sigma(t_k) \end{bmatrix} = \Upsilon_k \eta \quad (62)$$

$k = 1, \ldots, N$.

where $\Phi_k$, $\Psi_k$, $\Lambda_k$ and $\Upsilon_k$ are matrix functions of the time index k determined by the basis functions chosen. In this paper, we use piecewise linear basis functions with M=N, such that:

$$\phi_j(t) = \begin{cases} \frac{t_j - t}{\Delta t} & \text{when } t \in [t_{j-1}, t_j) \\ \frac{t - t_j}{\Delta t} & \text{when } t \in [t_j, t_{j+1}) \\ 0 & \text{otherwise,} \end{cases} \quad (63)$$

and:

$$p_j = \begin{bmatrix} u(t_j) \\ \sigma(t_j) \end{bmatrix} \quad (64)$$

$j = 0, \ldots, M$.

This corresponds to first-order hold discretization of a linear time invariant system for the dynamics of the spacecraft (44) and (45), with the vector $[r(t_k)^T, \dot{r}(t_k)^T, z(t_k)^T]^T$ as the state. Explicit expressions for $\Phi_k$, $\Psi_k$, $\Lambda_k$ and $\Upsilon_k$ can be obtained using standard techniques; we do not repeat this derivation here. As noted by Ref. 2, more sophisticated basis functions such as Chebyshev polynomials can be used, which may allow the controls to be described with significantly fewer coefficients, i.e. M<<N. Now, with the following additional notation, Problem 7 describes the discretized version of Problem 6:

$$E = [I_{3\times 3} \; 0_{3\times 4}] \; F = [0_{1\times 6} \; 1] \; E_u = [I_{3\times 3} \; 0_{3\times 1}] \; E_v = [0_{3\times 3} \; I_{3\times 3} \; 0_{3\times 1}]. \quad (65)$$

(Discretized Relaxed Minimum Landing Error Guidance Problem). Problem 7

$$\min_{N, \eta} \|E y_N\|^2 \quad (66)$$

subject to:

$$\|E_u \Upsilon_k \eta\| \leq e_\sigma^T \Upsilon_k \eta \; k = 0, \ldots, N \quad (67)$$

-continued $$\mu_1(t)\left[1-(Fy_k-z_0(t_k))+\frac{(Fy_k-z_0(t_k))^2}{2}\right]\leq \quad (68)$$
$$e_4^T Y_k \eta \leq \mu_2(t)[1-(Fy_k-z_0(t_k))]$$

$$Ey_k \in X k=1,\ldots,N \quad (69)$$

$$Fy_N \geq \ln m_{dry} \quad (70)$$

$$y_N^T e_1 = 0, E_v y_N^T = 0 \quad (71)$$

$$y_k = \Phi_k \begin{bmatrix} r_0 \\ \dot{r}_0 \\ \ln m_{wet} \end{bmatrix} + \Lambda_k \begin{bmatrix} g \\ 0 \end{bmatrix} + \Psi_k \eta \ k=1,\ldots,N. \quad (72)$$

Note that, for any given N, Problem 7 defines a finite-dimensional second-order-cone program (SOCP), which can be solved very efficiently with guaranteed convergence to the globally optimal solution by using existing SOCP algorithms.

Here N describes the time of flight since $t_f = N\Delta t$. To find the optimal time of flight, Ref. 2 propose performing a line search for the optimal N, solving at each iteration an SOCP for the remaining optimization parameters η. We perform an identical search to solve Problem 7, as described in Section IV-E.

E. Time of Flight Search

For minimum-fuel powered descent guidance, Ref. 2 uses a line search to find the optimal time of flight $t_f^*$. In this section we apply this approach to the minimum landing error guidance problem. Extending Ref. 2, Ref. 19 uses a Golden Search technique, which ensures that the interval in which the optimal value is known to lie shrinks by the same constant proportion at each iteration. Golden Search has been shown to be robust and efficient, and it gives an explicit interval in which the optimum is known to lie. This last property means that the search can be terminated when sufficient accuracy has been achieved. The technique relies, however, on two key properties of $J(t_f)$, the optimal cost of Problem 3 as a function of $t_f$:

$$J(t_f) = \min_{T_c(\cdot),\Gamma(\cdot)} \|r(t_f)\|^2 \text{ subject to (18) through (23).} \quad (73)$$

First, we must know an interval in which $t_f^*$ is known to lie. That is, we must find bounds $t_l$ and $t_u$ such that $t_l \leq t_f^* \leq t_u$. Second, $J(t_f)$ must be unimodal.

In Ref. 19, the authors solve the one-dimensional powered descent guidance problem using the approach of Ref. 5 to obtain values for $t_l$ and $t_u$. In the case of minimum landing error guidance, we can use the same approach to obtain $t_l$.

The approach of Ref. 5 gives the minimum-time solution in the vertical dimension only; that is, it determines the minimum-time thrust profile that eliminates the initial vertical velocity and ends with the lander at zero altitude. Denote the optimal time of this solution as $t_f^{1D}$. In the minimum landing error guidance problem the lander must also have zero final altitude and vertical velocity, hence the constraint set for the minimum landing error guidance problem is tighter than for the one-dimensional problem. This means that any feasible time-of-flight for Problem 3 is no less than $t_f^{1D}$, and hence we can set $t_l = t_f^{1D} \leq t_f^*$.

The approach of Ref. 19 for obtaining $t_u$ does not, however, extend to the minimum landing error case. Instead, we use a heuristic scaling to set $t_u = k_{scale} t_l$, where $k_{scale}$ is on the order of 3. Then, assuming unimodality of $J(t_f)$, the golden search approach checks analytically whether $t_u$ is a true upper bound. If not, $t_u$ is increased until it is an upper bound on $t_f^*$.

In Ref. 19, the authors observed experimentally that $J(t_f)$ is indeed a unimodal function. Since the present paper is concerned with the minimum landing error problem, this conclusion does not carry over from the minimum-fuel case. In Section V-B we show experimentally that $J(t_f)$ is unimodal, and that the Golden Search approach finds $t_f$ to within a few percent.

V. Simulation Results

In this section we present simulation results obtained using the new algorithm. The Second Order Cone Programs were solved using G-OPT, a JPL in-house convex optimizer. Simulations were run on a Macbook Pro 2.4 GHz with 4 GB RAM.

In Section V-A we present some example solutions generated by the new approach, while in Section V-B we demonstrate empirically the unimodality of the optimal solution with respect to the time of flight.

A. Example Solutions

We first consider a case where the target \emph{can} be reached given the available fuel, then a case when the target \emph{cannot} be reached. The spacecraft parameters for these simulations are:

$$g=[-3.7114\ 0\ 0]^T\ m_{dry}=1.505\ \text{kg}\ m_{wet}=1905\ \text{kg}$$
$$I_{sp}=225\ \text{s}\ \rho_1=4972\text{N}\ \rho_2=13260\text{N} \quad (74)$$

A glideslope constraint is used to prevent the trajectory from entering at a more shallow angle than 4°. The spacecraft initial position is given by:

$$r_0 = \begin{bmatrix} 1500\ \text{m} \\ 0 \\ 2000\ \text{m} \end{bmatrix}. \quad (75)$$

In Case 1, the initial velocity is denoted $r_0^{(1)}$ and is given by:

$$\dot{r}_0^{(1)} = \begin{bmatrix} -75\ \text{m/s} \\ 0 \\ 100\ \text{m/s} \end{bmatrix}. \quad (76)$$

Figure 2:
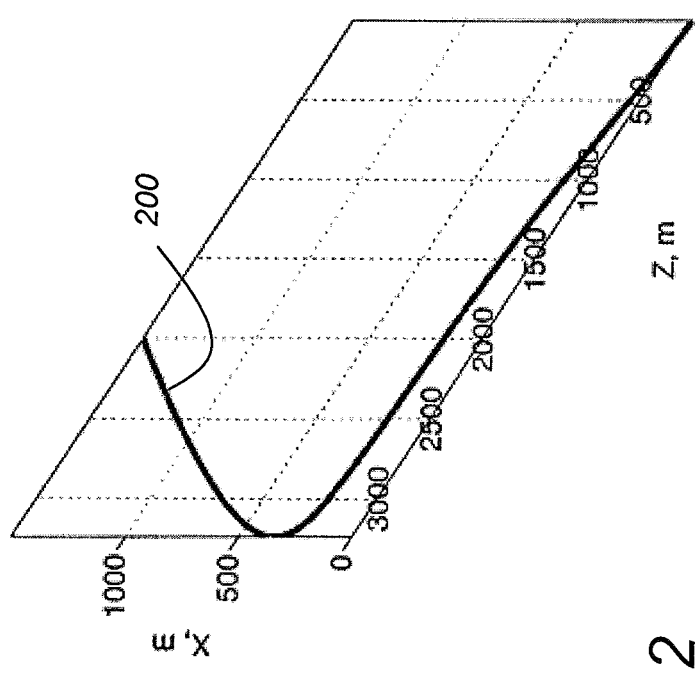
FIG. 2 is a three dimensional plot of an optimal trajectory generated using a minimum landing error targeting approach for Case 1, with $r_0 = [1500\ 0\ 2000,]^T$, $\dot{r}_0 = [75\ 0\ 100]^T$ (units in meters and meters/second, respectively). In this case, a feasible solution exists, so the prioritized minimum landing error algorithm returns the minimum fuel solution to the target.
Figures 3E, 3F, 3G, 3H:
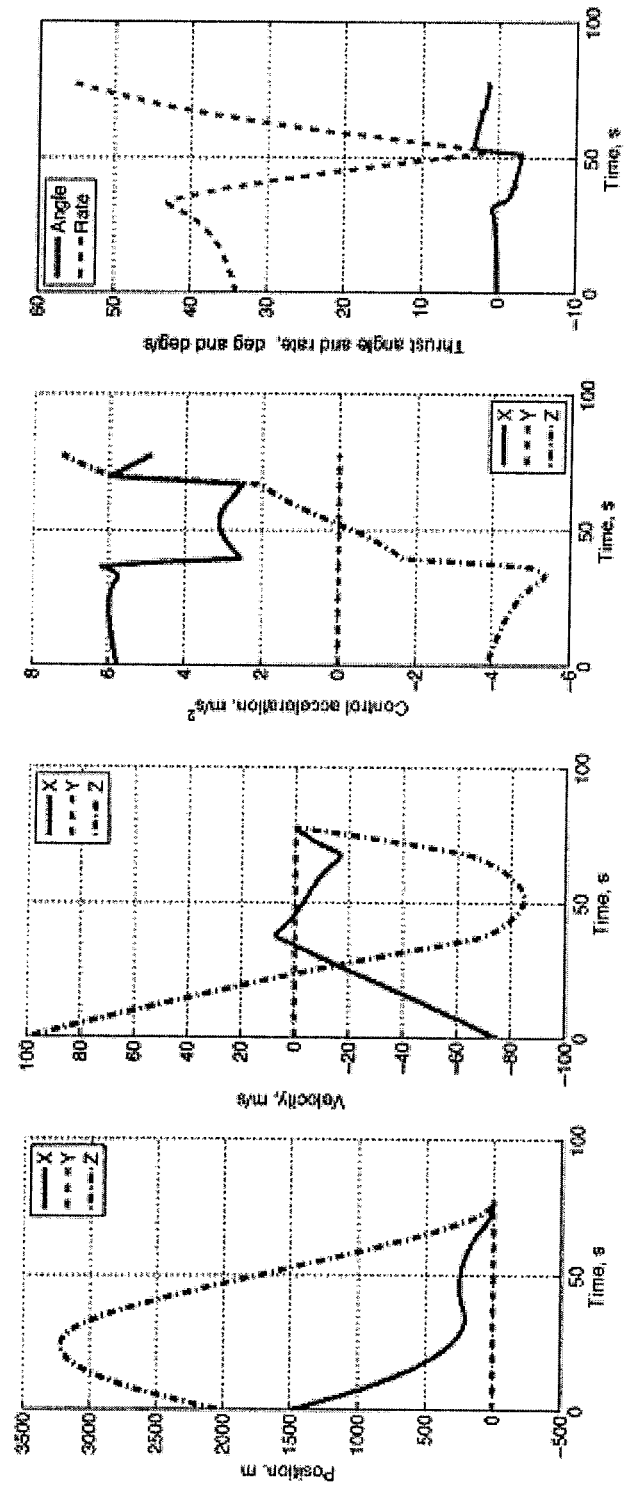
Figure 4:
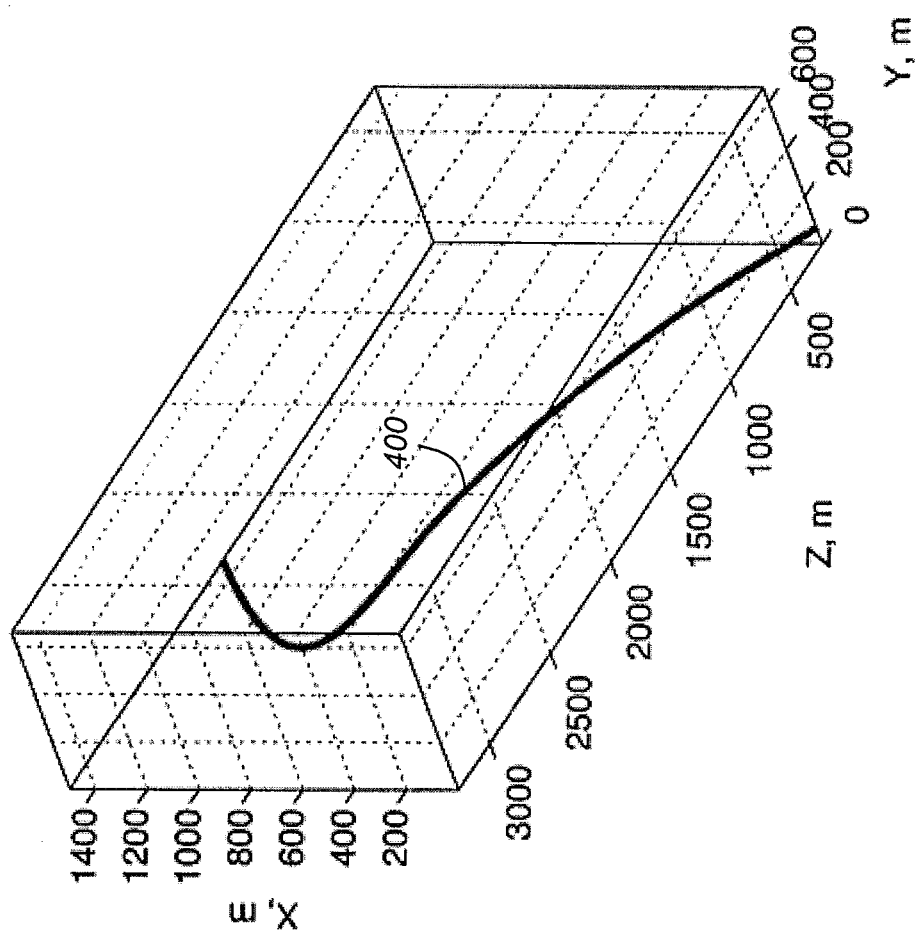
FIG. 4 is a three dimensional plot of an optimal trajectory using a minimum landing error targeting approach for Case 2 with $r_0 = [1500\ 0\ 2000,]^T$, $\dot{r}_0 = [-75\ 40\ 100]^T$ (units in meters and meters/second, respectively). In this case, no feasible solution to the target exists, so the minimum landing error solution approach returns the solution that minimizes the final distance to the target, which is 268 meters.

In Ref. 2 it is shown that there is a feasible solution to the target in this case, but that the solution requires almost all of the available fuel mass. This example illustrates the value of the convex optimization, which guarantees finding a solution if one exists; even cases at the edge of the physical feasibility can be solved. In FIG. 2 and FIGS. 3A-3D, we show results generated for Case 1 using the new prioritized minimum landing error PDG approach (Table 1) with 55 time discretization points. FIG. 2 is a three dimensional plot of an optimal trajectory 200 generated using a minimum landing error targeting approach for Case 1, with $r_0=[1500\ 0\ 2000,]^T$, $\dot{r}_0=[75\ 0\ 100]^T$ (units in meters and meters/second, respectively). In this case, a feasible solution exists, so the prioritized minimum landing error algorithm returns the minimum fuel solution to the target. FIGS. 3A and 3B show the optimal trajectory 200 in horizontal and vertical plane transfers, while FIGS. 3C and 3D show the angle above the surface 302 and optimal throttle 304, respectively. FIGS. 3E-3G illustrate the position, velocity, control acceleration for the optimal trajectory 200 in X, Y and Z coordinates, while FIG. 3G illustrates the thrust angle and rate. Golden Search was terminated when the optimal time of flight was known to within an interval of 3.0 s. Since there exists in this case a feasible solution to the target, the algorithm returns the minimum-fuel solution to the target. This solution requires 399.5 kg of fuel, has $t_f^*$=78.3 s and is identical to the solution reported by Ref. 2. The total computation time required was 14.3 s, and 23 iterations of Golden Search were used.

In Case 2, there is an additional initial velocity in the y direction:

$$\dot{r}_0^{(2)} = \begin{bmatrix} -75 \text{ m/s} \\ 40 \text{ m/s} \\ 100 \text{ m/s} \end{bmatrix}. \quad (77)$$

Since Case 1 used almost all of the available fuel, and Case 2 has an initial velocity in the y direction away from the target, it is most likely that there will be insufficient fuel to reach the target. We verify this by attempting to solve the minimum-fuel PDG problem using the algorithm of Ref. 2, which reports that the problem is infeasible, and that at least 410 kg of fuel is required to reach the target. The minimum landing error targeting algorithm, however, finds a solution that ensures safe landing at a distance of 268 m from the target. The solution, shown in FIG. 4 and FIGS. 5A-5H have has $t_f^*$=77.6 s and uses the full 400 kg of available fuel. The total computation time required was 16.24 s, and 23 iterations of Golden Search were used. FIGS. 5A and 5B show the resulting optimal trajectory 400, while FIG. 5C and FIG. 5D show the angle above the surface 502 and the optimal throttle 504, respectively. FIGS. 5E-5G show the values of position, velocity, and control acceleration for the trajectory as a function of time, respectively, while FIG. 5H shows the thrust angle and rate.

B. Unimodality of Cost as a Function of Time of Flight

Figure 6:
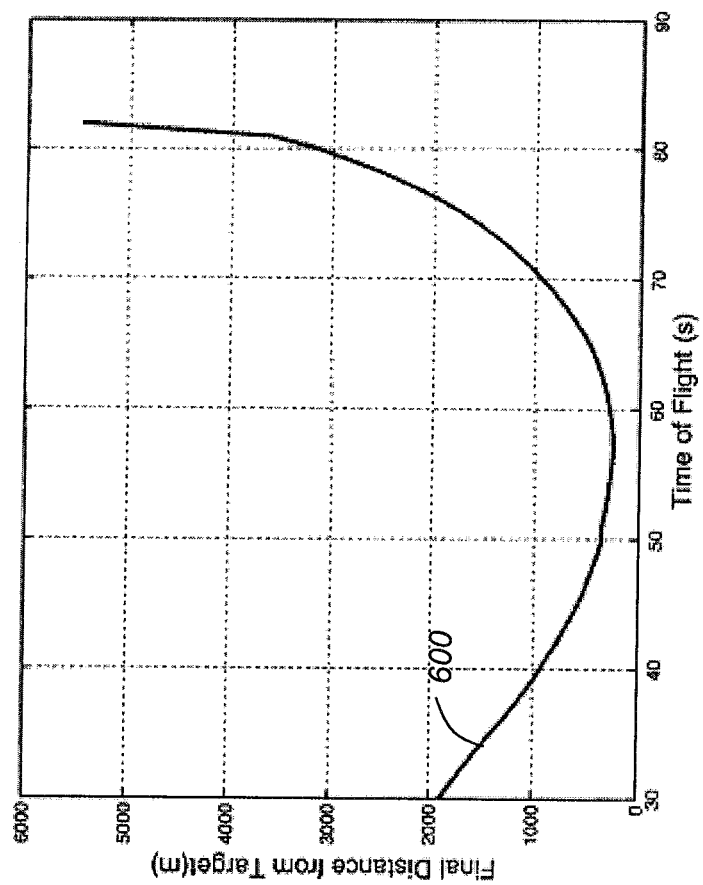
FIG. 6 is a diagram illustrating the dependence of minimum distance from the target on time of flight for a typical set of initial conditions. The relationship is unimodal and has an optimum at 56.35 seconds. The Golden Search determines the optimum to be 55.83 seconds, which is an error of only 0.9%.

In this section we demonstrate empirically that the optimal cost of the minimum landing error solution is unimodal in the time of flight. Throughout this section we use the spacecraft parameters given in (74). FIG. 6 shows a plot 600 $J(t_f)$ for a typical set of initial conditions, illustrating the dependence of minimum distance from the target on time of flight for a typical set of initial conditions. The graph was generated by specifying $t_f$ in increments of 1 s and solving Problem 7 for each value of $t_f$. In this case $J(t_f)$ is clearly unimodal, as required. By reducing the time increments to 0.01 s close to the minimum, the optimum was found to be at $t_f$=56.35 s. The Golden Search determines the optimum to be 55.83 s, which is an error of only 0.9%. Again Golden Search was terminated when the optimal time of flight was known to within an interval of 3.0 s. The efficacy of the Golden Search approach was investigated for a range of initial conditions by calculating the error between $t_f^*$ determined through Golden Search, and the true optimum. The true optimum was determined approximately by calculating $J(t_f)$ for $t_f \in [30,150]$ in increments of 1 s. Initial conditions were selected at random using a uniform distribution across a box of values specified by:

$$\begin{bmatrix} 1 \text{ km} \\ -5 \text{ km} \\ -5 \text{ km} \end{bmatrix} \leq r_0 \leq \begin{bmatrix} 2 \text{ km} \\ 5 \text{ km} \\ 5 \text{ km} \end{bmatrix} \begin{bmatrix} -30 \text{ m/s} \\ -100 \text{ m/s} \\ -100 \text{ m/s} \end{bmatrix} \leq \dot{r}_0 \leq \begin{bmatrix} -10 \text{ m/s} \\ 100 \text{ m/s} \\ 100 \text{ m/s} \end{bmatrix}.$$

Since we are only concerned with the unimodality of $J(t_f)$ in the minimum landing error case, solutions for which a feasible trajectory to the target existed were discarded. One hundred random initial conditions were chosen, and for these the average percentage error in $t_f^*$ was 0.012% with a standard deviation of 0.057%. The maximum error across all instances was 1.8%. This demonstrates that the Golden Search approach is effective for a broad range of initial conditions in the case of minimum landing error powered decent guidance.

VI. Implementation

A. Technique

Figure 7:
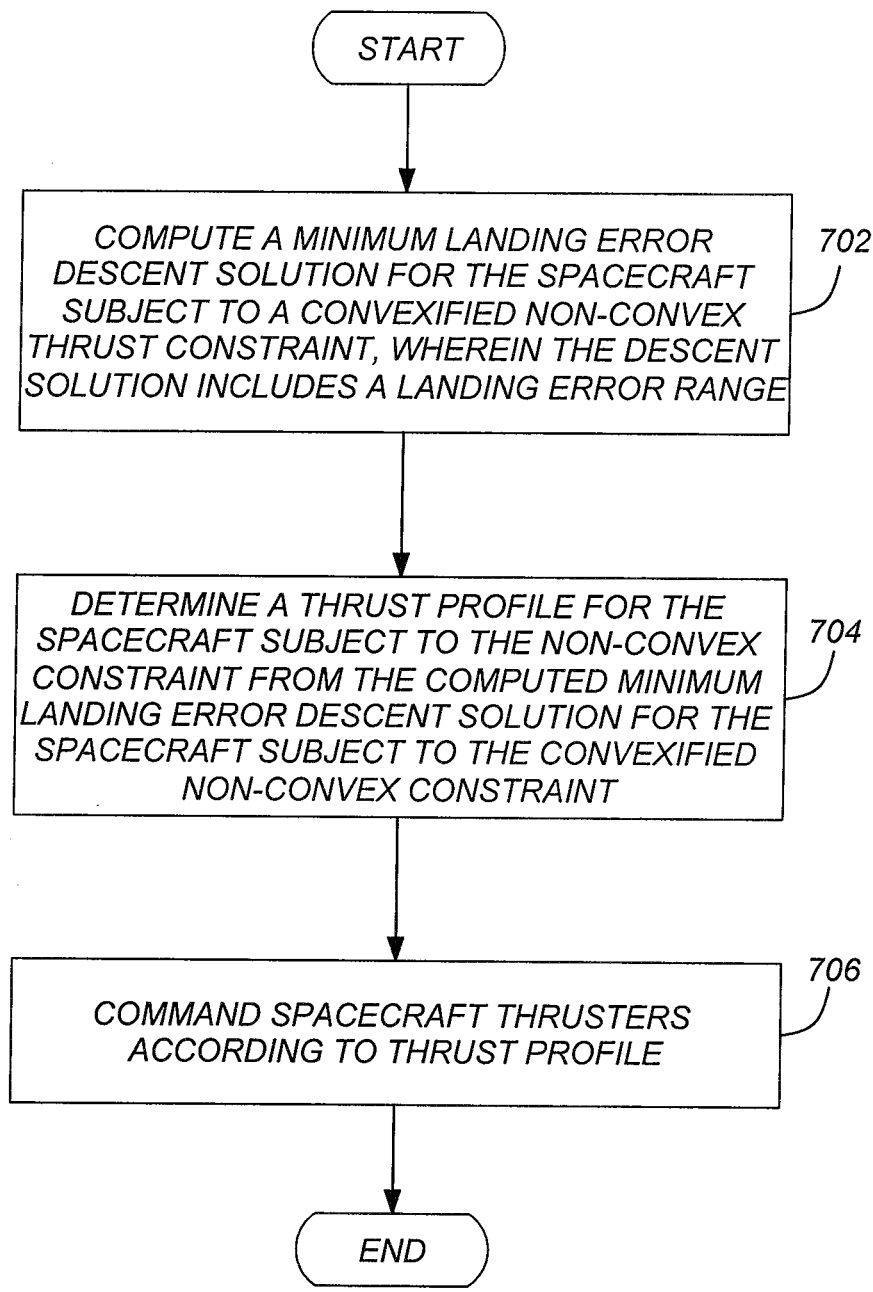
FIG. 7 is a diagram presenting illustrative method steps that can be used to command the thrusters to land the spacecraft.

FIG. 7 is a diagram presenting illustrative process steps that can be used to land the spacecraft. A minimum landing error descent solution is computed, as shown in block 702. As described in Section IV above, the solution can be computed for a spacecraft that is subject to non-convex thruster constraints, such as a minimum thrust and a maximum thrust. This solution is computed, by convexifying the non-convex thrust constraint, and determining a solution to the system subject to the convexified non-convex thrust constraint, as described in Problem 4.

If no computed solution exists, then landing cannot be performed safely under the specified conditions, and an "infeasible" result is returned. If a computed solution exists, it may be one in which the landing error range (difference between the desired landing point and the computed landing point, or D=$\|r(t_f^*)\|$) is zero, or it may be one in which the landing error range D is non-zero (e.g. the minimum landing error solution result in a landing error).

Next, a thrust profile for the spacecraft is determined from the result obtained above, as shown in block 704. In a simple embodiment, this can be accomplished, for example, by simply setting the thrust profile to $T_c^*(\bullet)$ as obtained by solving Problem 4. This thrust profile may be used to command the spacecraft thrusters during powered descent, as shown in block 706.

However, as described above, the optimal, feasible solution to the convexified minimum landing error problem (Problem 4) is not necessarily an optimal, feasible solution to the original (non-convex) minimum landing error problem. Also, while the solution to Problem 4 computed above may provide a solution to land the spacecraft on the surface with minimum error when feasible, this is not necessarily a fuel-optimal solution. That is, the solution is not necessarily that solution that minimizes landing thruster fuel use in landing the spacecraft at the landing point. Therefore, setting the thrust profile to $T_c^*(\bullet)$ for a this point will not guarantee a solution that (1) minimizes landing error, (2) minimizes landing thruster fuel use, and (3) ensures that all of the non-convex thruster constraints are satisfied.

A solution that meets all three objectives can be obtained, however, by taking the further step of convexifying the non-convex thruster constraints and solving the convexified minimum fuel guidance problem subject to constraints that include the landing error range D computed in block 702 above (e.g. solving Problem 5). The resulting solution minimizes landing error and landing thruster fuel use and ensures that all of the non-convex thruster constraints are satisfied.

Figure 8:
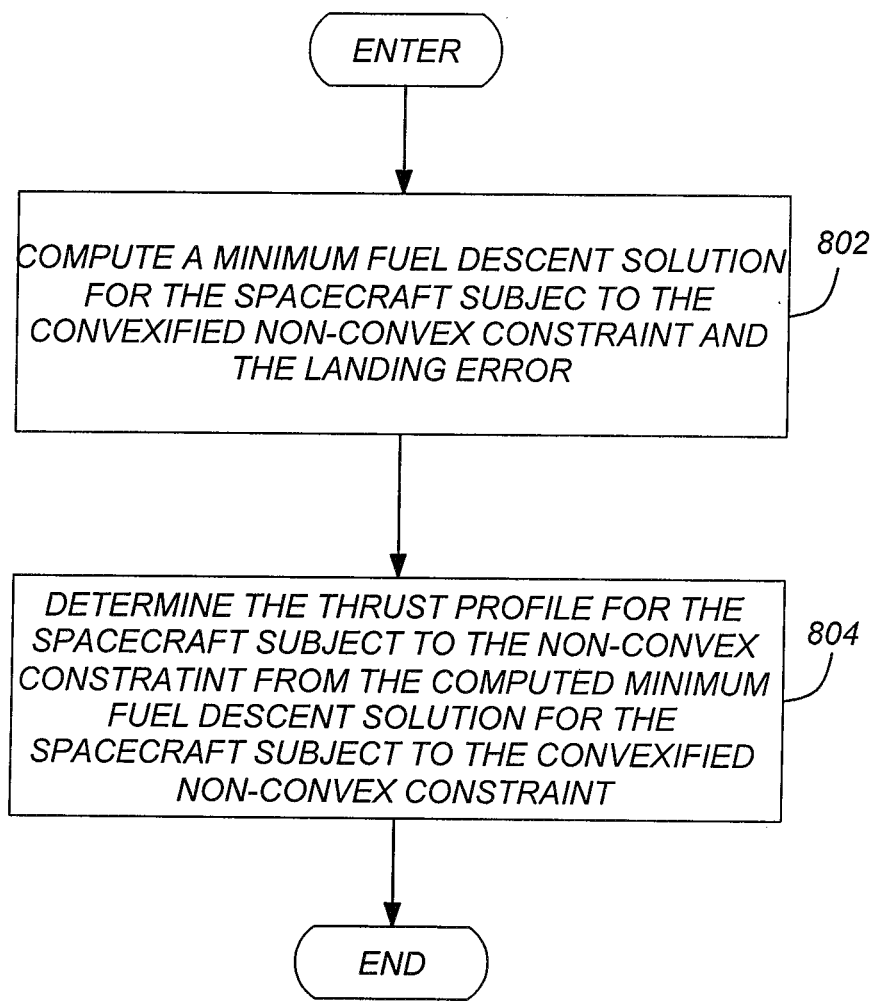
FIG. 8 is a diagram presenting exemplary method steps that can be used to determine the thrust profile for the spacecraft subject to the non-convex constraint from the computed minimum landing error descent solution for the spacecraft subject to the convexified non-convex constraint.

FIG. 8 is a diagram illustrating how the process of block 704 (determining the thrust profile for the spacecraft subject to the non-convex constraint from the solution computed in block 702) can be performed in such a way so as to minimize landing error and fuel use, and so as to ensure that all non-convex thruster constraints are satisfied. As shown in block 802, a minimum fuel descent solution for the spacecraft is computed subject to the convexified non-convex constraint and the landing error D computed in block 702. The resulting thrust profile $T_c^+(\bullet)$ for the spacecraft subject to the non-convex thrust constraint is then computed from the minimum fuel descent solution for the convexified non-convex thrust constraint, as shown in block 804. This resulting thrust profile $T_c^+(\cdot)$ is not only a minimum error solution and a minimum fuel solution to land the spacecraft with that minimum error, it is also a solution that satisfies all non-convex thruster constraints are satisfied.

B. Spacecraft and Control System

Figure 9:
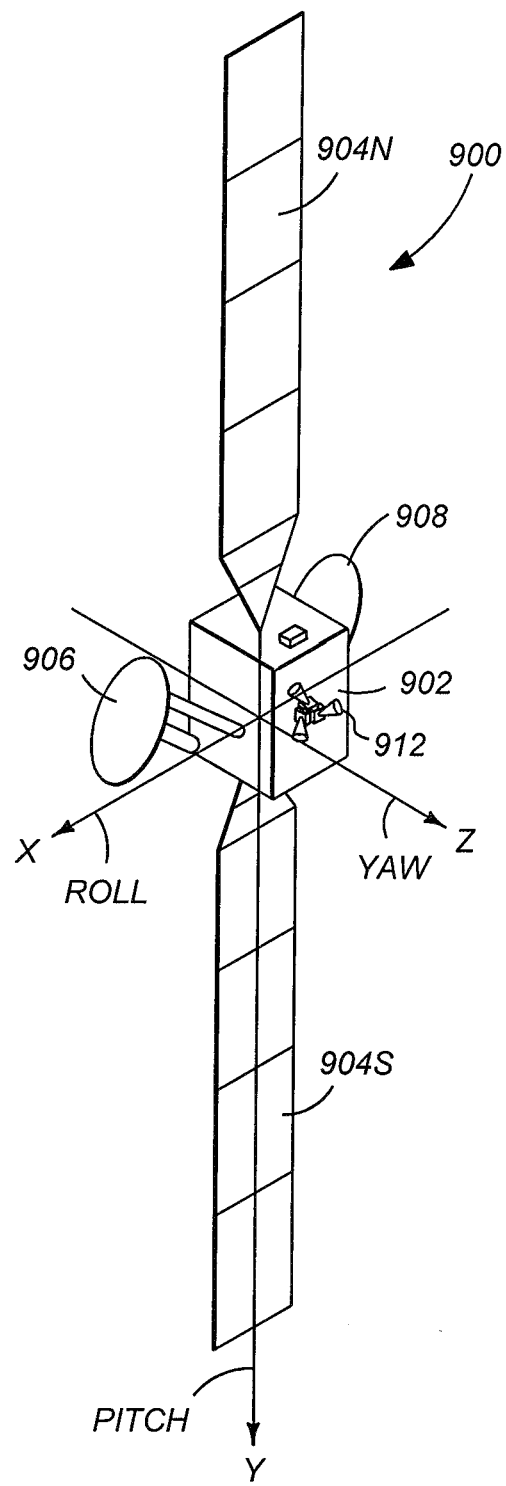
FIG. 9 is a diagram of an exemplary spacecraft.

FIG. 9 illustrates a three-axis stabilized spacecraft 900. The spacecraft 900 has a main body 902, a high gain narrow beam antennas 906, and a telemetry and command antenna 908 which is aimed at a control ground station. The spacecraft 900 may also include one or more sensors 912 to measure the attitude of the spacecraft 900. These sensors may include sun sensors, earth sensors, and star sensors.

The spacecraft 900 has a power supply that may include an internal nuclear power supply and/or solar panels 904 that are used to collect solar energy. The solar panels 904 may be stowed or jettisoned prior to landing.

Since the solar panels are often referred to by the designations "North" and "South", the solar panels in FIG. 9 are referred to by the numerals 904N and 904S for the "North" and "South" solar panels, respectively. The spacecraft may have a plurality of attitude control thrusters as well as landing thrusters 912, which are used when the spacecraft 900 is landing on a surface.

The three axes of the spacecraft 900 are shown in FIG. 9. The pitch axis Y lies along the plane of the solar panels 904N and 904S. The roll axis X and yaw axis Z are perpendicular to the pitch axis P and lie in the directions and planes shown.

Figure 10:
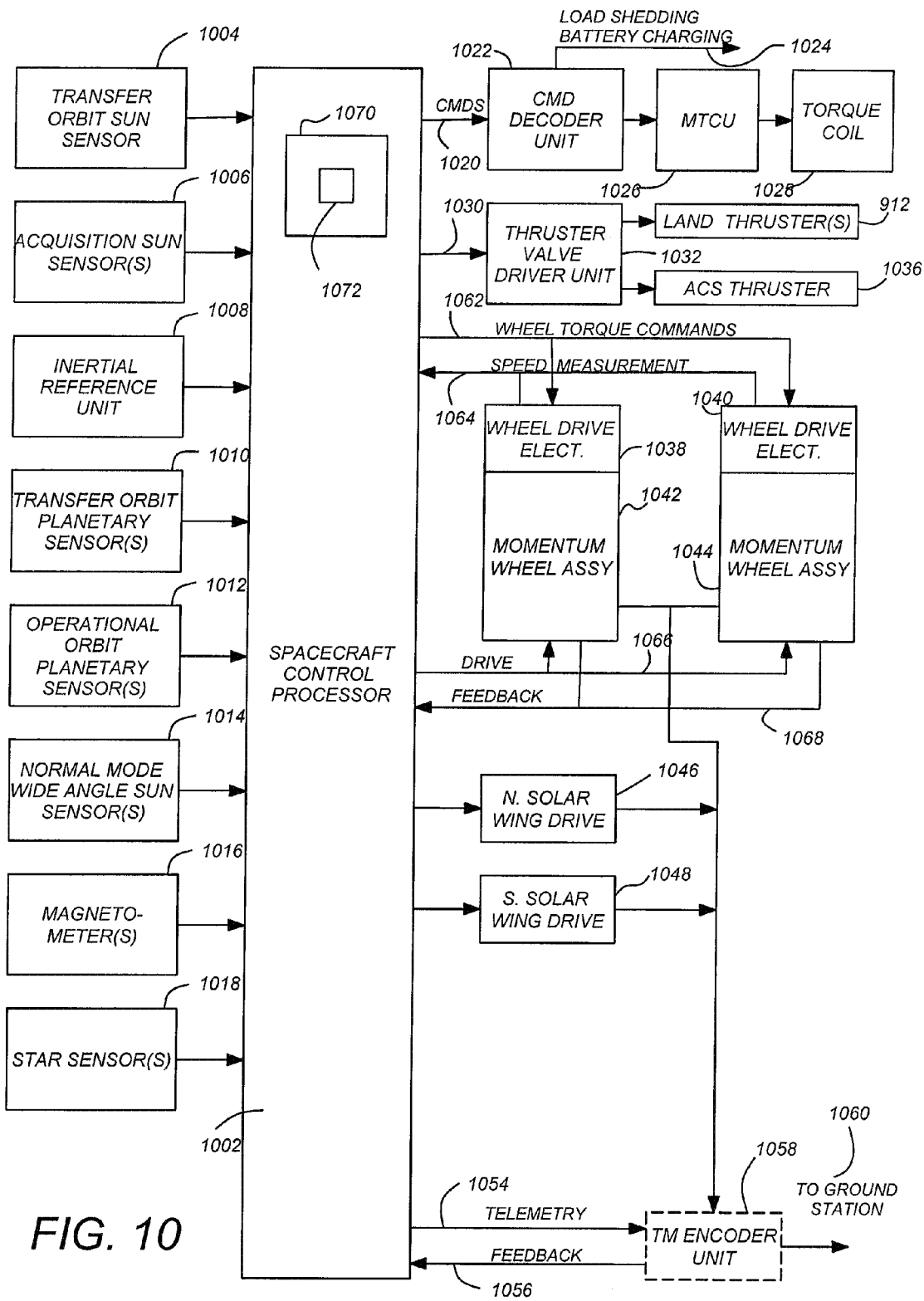
FIG. 10 is a diagram depicting the functional architecture of a representative spacecraft guidance and control system.

FIG. 10 is a diagram depicting the functional architecture of a representative spacecraft guidance and control system. Control of the spacecraft is provided by a computer or spacecraft control processor (SCP) 1002. The SCP performs a number of functions which may include post ejection sequencing, transfer orbit processing, acquisition control, stationkeeping control, normal mode control, mechanisms control, fault protection, and spacecraft systems support, landing control, and others.

Input to the spacecraft control processor 1002 may come from a any combination of a number of spacecraft components and subsystems, such as a transfer orbit sun sensor 1004, an acquisition sun sensor 1006, an inertial reference unit 1008, a transfer orbit sensor 1010, an operational orbit sensor 1012, a normal mode wide angle sun sensor 1014, a magnetometer 1016, and one or more star sensors 1018.

The SCP 1002 generates control signal commands 1020 which are directed to a command decoder unit 1022. The command decoder unit operates the load shedding and battery charging systems 1024. The command decoder unit also sends signals to the magnetic torque control unit (MTCU) 1026 and the torque coil 1028.

The SCP 1002 also sends control commands 1030 to the thruster valve driver unit 1032 which in turn controls the landing thrusters 912 and the attitude control thrusters 1036.

Wheel torque commands 1062 are generated by the SCP 1002 and are communicated to the wheel speed electronics 1038 and 1040. These effect changes in the wheel speeds for wheels in momentum wheel assemblies 1042 and 1044, respectively. The speed of the wheels is also measured and fed back to the SCP 1002 by feedback control signal 1064.

The spacecraft control processor 1002 also sends jackscrew drive signals 1066 to the momentum wheel assemblies 1042 and 1044. These signals control the operation of the jackscrews individually and thus the amount of tilt of the momentum wheels. The position of the jackscrews is then fed back through command signal 1068 to the spacecraft control processor. The signals 1068 are also sent to the telemetry encoder unit 1058 and in turn to the ground station 1060. The spacecraft control processor 1002 also sends signals to solar wing drives 1046 and 1048.

The spacecraft control processor also sends command signals 1054 to the telemetry encoder unit 1058 which in turn sends feedback signals 1056 to the SCP 1002. This feedback loop, as with the other feedback loops to the SCP 1002 described earlier, assist in the overall control of the spacecraft. The SCP 1002 communicates with the telemetry encoder unit 1058, which receives the signals from various spacecraft components and subsystems and then relays them to the ground station 1060.

The wheel drive electronics 1038, 1040 receive signals from the SCP 1002 and control the rotational speed of the momentum wheels. The jackscrew drive signals 1066 adjust the orientation of the angular momentum vector of the momentum wheels. This accommodates varying degrees of attitude steering agility and accommodates movement of the spacecraft as required.

The use of reaction wheels or equivalent internal torquers to control a momentum bias stabilized spacecraft allows inversion about yaw of the attitude at will without change to the attitude control. In this sense, the canting of the momentum wheel is entirely equivalent to the use of reaction wheels.

The SCP 1002 may include or have access to memory 1070, such as a random access memory (RAM). Generally, the SCP 1002 operates under control of an operating system 1072 stored in the memory 1070, and interfaces with the other system components to accept inputs and generate outputs, including commands. Applications running in the SCP 1002 access and manipulate data stored in the memory 1070. The spacecraft 900 may also comprise an external communication device such as a spacecraft link for communicating with other computers at, for example, a ground station. If necessary, operation instructions for new applications can be uploaded from ground stations.

In one embodiment, instructions implementing the operating system 1072, application programs, and other modules are tangibly embodied in a computer-readable medium, e.g., data storage device, which could include a RAM, EEPROM, or other memory device. Further, the operating system 1072 and the computer program are comprised of instructions which, when read and executed by the SCP 1002, causes the spacecraft processor 1002 to perform the steps necessary to implement and/or use the present invention. Computer program and/or operating instructions may also be tangibly embodied in memory 1070 and/or data communications devices (e.g. other devices in the spacecraft 900 or on the ground), thereby making a computer program product or article of manufacture according to the invention. As such, the terms "program storage device," "article of manufacture" and "computer program product" as used herein are intended to encompass a computer program accessible from any computer readable device or media.

C. Ground Station Processing

Figure 11:
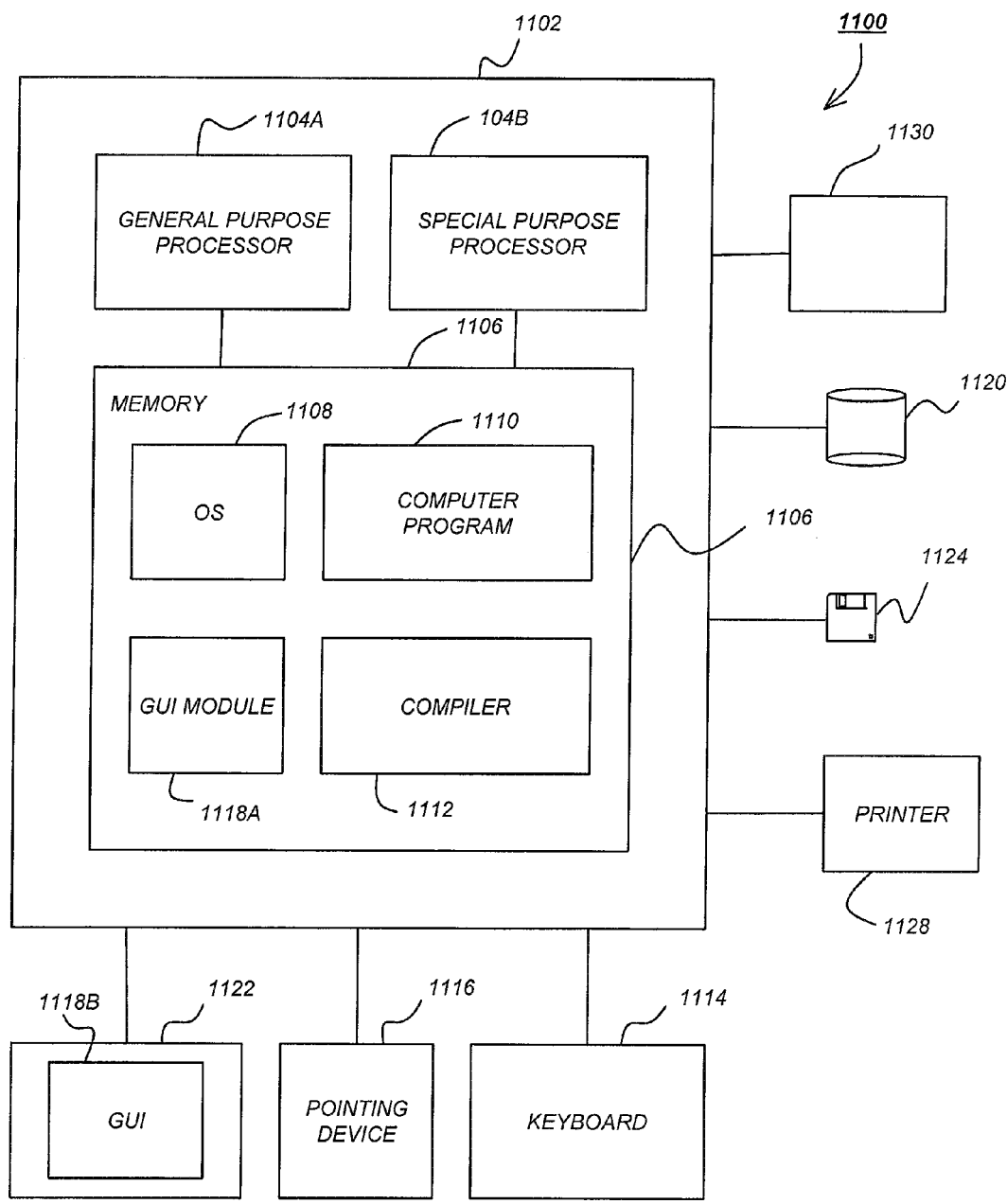
FIG. 11 is a diagram depicting an exemplary computer system that could be used to implement elements of the present invention at a ground station.

FIG. 11 is a diagram illustrating an exemplary computer system 1100 that could be used to implement elements of the present invention at the ground station. The computer 1102 comprises a general purpose hardware processor 1104A and/or a special purpose hardware processor 1104B (hereinafter alternatively collectively referred to as processor 1104) and a memory 1106, such as random access memory (RAM). The computer 1102 may be coupled to other devices, including input/output (I/O) devices such as a keyboard 1114, a mouse device 1116 and a printer 1128.

In one embodiment, the computer 1102 operates by the general purpose processor 1104A performing instructions defined by the computer program 1110 under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108 to provide output and results.

Output/results may be presented on the display 1122 or provided to another device for presentation or further processing or action. In one embodiment, the display 1122 comprises a liquid crystal display (LCD) having a plurality of separately addressable pixels formed by liquid crystals. Each pixel of the display 1122 changes to an opaque or translucent state to form a part of the image on the display in response to the data or information generated by the processor 1104 from the application of the instructions of the computer program 1110 and/or operating system 1108 to the input and commands. Other display 1122 types also include picture elements that change state in order to create the image presented on the display 1122. The image may be provided through a graphical user interface (GUI) module 1118A. Although the GUI module 1118A is depicted as a separate module, the instructions performing the GUI 118B functions can be resident or distributed in the operating system 1108, the computer program 1110, or implemented with special purpose memory and processors.

Some or all of the operations performed by the computer 1102 according to the computer program 1110 instructions may be implemented in a special purpose processor 1104B. In this embodiment, some or all of the computer program 1110 instructions may be implemented via firmware instructions stored in a read only memory (ROM), a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1102 may also implement a compiler 1112 which allows an application program 1110 written in a programming language such as COBOL, C++, FORTRAN, or other language to be translated into processor 1104 readable code. After completion, the application or computer program 1110 accesses and manipulates data accepted from I/O devices and stored in the memory 1106 of the computer 1102 using the relationships and logic that was generated using the compiler 1112.

The computer 1102 also optionally comprises an external communication device such as a modem, spacecraft link, Ethernet card, or other device for accepting input from and providing output to other computers.

In one embodiment, instructions implementing the operating system 1108, the computer program 1110, and/or the compiler 1112 are tangibly embodied in a computer-readable medium, e.g., data storage device 1120, which could include one or more fixed or removable data storage devices, such as a zip drive, floppy disc drive 1124, hard drive, CD-ROM drive, tape drive, or a flash drive. Further, the operating system 1108 and the computer program 1110 are comprised of computer program instructions which, when accessed, read and executed by the computer 1102, causes the computer 1102 to perform the steps necessary to implement and/or use the present invention or to load the program of instructions into a memory, thus creating a special purpose data structure causing the computer to operate as a specially programmed computer executing the method steps described herein. Computer program 1110 and/or operating instructions may also be tangibly embodied in memory 1106 and/or data communications devices 1130, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1102.

REFERENCES

[1] Knocke, P. C., Wawrzyniak, G. G., Kennedy, B. M., Desai, P. N., Parker, T. J., Golombek, M. P., Duxbury, T. C., and Kass, D. M., "Mars Exploration Rovers Landing Dispersion Analysis." *Proceedings of the AIAA/AAS Astrodynamics Specialist Conference*, 2004.

[2] Acikmese, B. and Ploen, S. R., "Convex Programming Approach to Powered Descent Guidance for Mars Landing," *AIAA Journal of Guidance, Control and Dynamics*, Vol. 30, No. 5; 2007, pp. 1353-1366.

[3] Arvidson, R.: Adams, D., Bonfiglio, G., Christensen, P., Cull, S., Golombek, M., Guinn, J., Guinness, E., Heet, T., Kirk, R., Knudson. A, Malin, M., Mellon, M., McEwen, A., Mushkin, A., Parker, T. Seelos, F., Seelos, K., Smith, P., Spencer, D., Stein; T., and Tamppari, L., "Mars Exploration Program 2007 Phoenix landing site selection and characteristics," *Journal of Geophysical Research*, Vol. 113, 2008.

[4] Wolf, A. A., Tooley, J. Ploen, S., Ivanov, M., Acikmese, B. and Gromov, K. "Performance Trades for Mars pinpoint landing," IEEE Aerospace Conference, 2006.

[5] Meditch, J. S., "On the Problem of Optimal Thrust Programming For a Lunar Soft Landing," *IEEE Transactions on Automatic Control*, Vol. AC-9, No. 4, 1964, pp. 477-484.

[6] Klumpp, A. R., "Apollo Lunar Descent Guidance." *Automatica*, Vol. 10, 1974, pp. 133-146.

[7] Topcu, U., Casoliva, J.: and Mease, K., "Fuel Efficient Powered Descent Guidance for Mars landing," *AIAA Guidance, Navigation, and Control Conference*, San Francisco, Calif., 2005.

[8] Sostaric, R. and Rea, J., "Powered Descent Guidance Methods for the Moon and Mars," *AIAA Guidance, Navigation, and Control Conference*, San Francisco, Calif., 2005.

[9] Najson, F. and Mease, K., "A Computationally Non-expensive Guidance Algorithm for Fuel Efficient Soft Landing," *AIAA Guidance, Navigation, and Control Conference*, San Francisco, Calif., 2005.

[10] Steinfeldt, B., Grant, M., Matz, D., and Braun, R., "Guidance, Navigation, and Control Technology System Trades for Mars Pinpoint Landing," *Proceedings of the AIAA Guidance, Navigation and Control Conference* 2008, 2008.

[11] Sturm, J. F.; "Using SeDuMi 1.02, a MATLAB Toolbox for Optimization Over Symmetric Cones," *Optimkation Methods and Software*, Vol. 11. No. 1, 1999. pp. 625-653.

[12] Sturm, J. F., "Implementation of Interior Point Methods for Mixed Semidefinite and Second Order Cone Optimization Problems," *Optimkation Methods and Software*, Vol. 17, No. 6, 2002, pp. 1105-1154.

[13] D'Souza, C., "An Optimal Guidance Law for Planetary Landing," *Proceedings of the AIAA Guidance, Navigation and Control Conference 1997*, 1997.

[14] Ploen. S., Acikmese, B., and Wolf, A., "A Comparison of Powered Descent Guidance Laws for Mars Pinpoint Landing," *AIAA Guidance, Navigation, and Control Conference*, Keystone, Colo., 2006.

[15] Fahroo, F. and Ross, I. M., "Direct Trajectory Optimization by a Chebyshev Pseudospectral Method," *Journal of Guidance, Control, and Dynamics*, Vol. 25, No. 1, 2002, pp. 160-166.

[16] Vlassenbroeck, J. and Dooren, R. V., "A Chebyshev Technique for Solving Nonlinear Optimal Control Problems," *IEEE Transactions on Automatic Control*, Vol. 33, No. 4, 1988, pp. 333-340.

[17] Acikmese, B. and Ploen, S., "A Powered Descent Guidance Algorithm for Mars Pinpoint Landing," *AIAA Guidance, Navigation, and Control Conference*, San Francisco, Calif., 2005.

[18] Vandenberghe, L. and Boyd, S., "Semidefinite Programming," *SIAM Review*. Vol. 38, No. 1. 1995, pp. 49-95.

[19] Acikmese, B. Blackmore, L., Scharf, D. P., and Wolf, A., "Enhancements on the Convex Programming Based Powered Descent Guidance Algorithm for Mars Landing," *Proceedings of the AIAA Guidance, Navigation and Control Conference 2008*, 2008.

What is claimed is:

1. A method of computing a thrust profile to land a spacecraft at or near a surface target, wherein the spacecraft is subject to a non-convex thrust constraint, comprising the steps of:
computing a minimum landing error descent solution for the spacecraft subject to a convexified non-convex constraint, wherein the descent solution includes a landing error range; and
determining the thrust profile for the spacecraft subject to the non-convex constraint from the computed minimum landing error descent solution for the spacecraft subject to the convexified non-convex constraint.

2. The method of claim 1, wherein the step of determining the thrust profile for the spacecraft subject to the non-convex constraint from the computed minimum landing error descent solution subject to the convexified non-convex thrust constraint comprises the steps of:
computing a minimum fuel descent solution for the spacecraft subject to the convexified non-convex constraint and the landing error range; and
determining the thrust profile for the spacecraft subject to the non-convex constraint from the computed minimum fuel descent solution for the spacecraft subject to the convexified non-convex constraint.

3. The method of claim 2, wherein the step of computing a minimum landing error descent solution for the spacecraft subject to the convexified non-convex thrust constraint comprises the steps of computing $$\min_{t_f, T_c(\cdot), \Gamma(\cdot)} \|r(t_f)\|^2$$

subject to the first set of constraints comprising the constraints of:

$$\ddot{r}(t) = g + T_c(t)/m(t), \dot{m}(t) = \alpha\Gamma(t)$$

$$\|T_c(t)\| \le \Gamma(t), 0 < \rho_1 \le \Gamma(t) \le \rho_2$$

$$r(t) \in X \forall t \in [0, t_f]$$

$$m(0) = m_{wet}, m(t_f) \ge m_{dry}$$

$$r(0) = r_0, \dot{r}(0) = \dot{r}_0$$

$$r(t_f)^T e_1 = 0, r(t_f) = 0$$

wherein
r(t) is a position vector of the spacecraft as a function of flight time;
$\dot{r}(t)$ is a velocity vector of the spacecraft as a function of flight time;
$\ddot{r}(t)$ is an acceleration vector of the spacecraft as a function of flight time;
t is the time from beginning of powered landing;
t(0) is the time at the beginning of powered landing
$t(f) = t_f$ is the time at the ending of powered landing;
$T_c(t)$ is a net thrust force vector acting on the spacecraft as a function of flight time;
m(t) is a mass of the spacecraft as a function of flight time;
$\dot{m}(t)$ is a mass change of the spacecraft as a function of flight time;
X is the set of feasible positions of the spacecraft;
m(0) is the spacecraft mass at the beginning of the thrust profile;
$m(t_f)$ is the spacecraft mass at the end of the thrust profile;
$m_{dry}$ is the initial mass of the spacecraft without fuel;
$m_{wet}$ is the initial mass of the spacecraft with fuel;

$$\alpha = \frac{1}{I_{sp}g_e\cos\phi},$$

wherein $I_{sp}$ is the specific impulse of the thruster, $g_e$ is the earth's gravitational constant, $T_1$ and $T_2$ are the lower and upper limits of the thrust force that can be provided by each thruster;
$\rho_1 = nT_1 \cos\phi$ is the minimum thrust value available from the thruster(s);
$\rho_2 = nT_2 \cos\phi$ is the maximum thrust value available from the thrusters(s);
$e_i$ is a unit vector of all zeros except the $i^{th}$ row, which is unity; and
$\Gamma(t)$ = slack variable that bounds thrust magnitude.

4. The method of claim 3, wherein $$\min_{t_f, T_c(\cdot), \Gamma(\cdot)} \|r(t_f)\|^2$$

subject to the first set of constraints is computed as $$\min_{N,\eta} \|Ey_N\|^2,$$

subject to a second set of constraints comprising:

$$\|E_u Y_k \eta\| \le e_\sigma^T Y_k \eta$$

for k = 0, ... , N $$\mu_1(t)\left[1 - (Fy_k - z_0(t_k)) + \frac{(Fy_k - z_0(t_k))^2}{2}\right] \le$$

$$e_4^T Y_k \eta \le \mu_2(t)[1 - (Fy_k - z_0(t_k))]$$

$$Ey_k \in X \; k = 1, \ldots, N$$

$$Fy_N \ge \ln m_{dry}$$

-continued $$y_N^T e_1 = 0,$$

$$E_v y_N^T = 0$$

$$y_k = \Phi_k \begin{bmatrix} r_0 \\ \dot{r}_0 \\ \ln m_{wet} \end{bmatrix} + \Lambda_k \begin{bmatrix} g \\ 0 \end{bmatrix} + \Psi_k \eta$$

$$k = 1, \ldots, N$$

wherein $$t_k = k\Delta t,$$

$$k = 0, \ldots, N$$

$$\sigma(t) = \frac{\Gamma(t)}{m(t)}$$

$$u(t) = \frac{T_c(t)}{m(t)}$$

$$z(t) = \ln m(t)$$

$$\eta = \begin{bmatrix} p_0 \\ \vdots \\ p_m \end{bmatrix},$$

wherein $p_j$ is a vector of parameters and $p_j \in R^4$ $$E = [I_{3\times3}\ 0_{3\times1}],\ F = [0_{1\times6}\ 1],\ E_u = [I_{3\times3}\ 0_{3\times1}],\ E_v = [0_{3\times3}\ I_{3\times3}\ 0_{3\times1}]$$

$$Y_k \eta = \begin{bmatrix} u(t_k) \\ \sigma(t_k) \end{bmatrix},$$

wherein $u(t_k)$=is the control input, and $$\sigma(t_k) = \frac{\Gamma(t_k)}{m(t_k)}$$

$\mu_1(t) = \rho_1 e^{-z_0}$, wherein $z_0$=a lower bound on $\ln m(t)$
$\mu_2(t) = \rho e^{-z_0}$, wherein $z_0$=a lower bound on $\ln m(t)$ $$y_k = \begin{bmatrix} r(t_k) \\ \dot{r}(t_k) \\ z(t_k) \end{bmatrix}$$

$r(t_k)$ is $r(t)t_k$
$\dot{r}(t_k)$ is $\dot{r}(t)$ at $t_k$
$z(t_k)$ is $z(t)$ at $t=t_k$
$e_4^T$=A transpose of a vector of all zeros except the fourth element, which is unity
$y_N^T$=A transpose of $y_k$ at the final time step N
$\Phi_k, \Lambda_k, \Psi_k, Y_k$ are discrete time state transition matrices describing the solution to $\ddot{r}(t)=u(t)+g$ and $$\dot{z} = \frac{\dot{m}(t)}{m(t)} = -\alpha\sigma(t)$$

wherein g is the acceleration of gravity of the planet or object the spacecraft is landing on.

5. An apparatus for computing a thrust profile to land a spacecraft at or near a surface target, wherein the spacecraft is subject to a non-convex thrust constraint, comprising the steps of:
 a spacecraft processor;
 a memory, communicatively coupled to the processor, the memory for storing instructions comprising
 instructions for computing a minimum landing error descent solution for the spacecraft subject to a convexified non-convex constraint, wherein the descent solution includes a landing error range; and
 instructions for determining the thrust profile for the spacecraft subject to the non-convex constraint from the computed minimum landing error descent solution for the spacecraft subject to the convexified non-convex constraint;
 a thruster, communicatively coupled to the spacecraft processor, for maneuvering the spacecraft according to the determined thrust profile.

6. The apparatus of claim 5, wherein the instructions for determining the thrust profile for the spacecraft subject to the non-convex constraint from the computed minimum landing error descent solution subject to the convexified non-convex thrust constraint comprise:
 instructions for computing a minimum fuel descent solution for the spacecraft subject to the convexified non-convex constraint and the landing error range; and
 instructions for determining the thrust profile for the spacecraft subject to the non-convex constraint from the computed minimum fuel descent solution for the spacecraft subject to the convexified non-convex constraint.

7. The apparatus of claim 6, wherein the instructions computing a minimum landing error descent solution for the spacecraft subject to the convexified non-convex thrust constraint comprises the instructions for computing $$\min_{t_f, T_c(\cdot), \Gamma(\cdot)} \|r(t_f)\|^2$$

subject to the first set of constraints comprising the constraints of:

$$\ddot{r}(t)=g+T_c(t)/m(t),\ \dot{m}(t)=\alpha\Gamma(t)$$

$$\|T_c(t)\| \leq \Gamma(t),\ 0<\rho_1 \leq \Gamma(t) < \rho_2$$

$$r(t) \in X \forall t \in [0,t_f]$$

$$m(0)=m_{wet},\ m(t_f) \geq m_{dry}$$

$$r(0)=r_0,\ \dot{r}(0)=\dot{r}_0$$

$$r(t_f)^T e_1 = 0,\ \dot{r}(t_f)=0$$

wherein
 r(t) is a position vector of the spacecraft as a function of flight time;
 $\dot{r}(t)$ is a velocity vector of the spacecraft as a function of flight time;
 $\ddot{r}(t)$ is an acceleration vector of the spacecraft as a function of flight time;
 t is the time from beginning of powered landing;
 t(0) is the time at the beginning of powered landing
 $t(t)=t_f$ is the time at the ending of powered landing;

$T_c(t)$ is a net thrust force vector acting on the spacecraft as a function of flight time;

$m(t)$ is a mass of the spacecraft as a function of flight time;

$\dot{m}(t)$ is a mass change of the spacecraft as a function of flight time;

X is the set of feasible positions of the spacecraft;

$m(0)$ is the spacecraft mass at the beginning of the thrust profile;

$m(t_f)$ is the spacecraft mass at the end of the thrust profile;

$m_{dry}$ is the initial mass of the spacecraft without fuel;

$m_{wet}$ is the initial mass of the spacecraft with fuel;

$$\alpha = \frac{1}{I_{sp}g_e\cos\phi},$$

wherein $I_{sp}$ is the specific impulse of the thruster, $g_e$ is the earth's gravitational constant, $T_1$ and $T_2$ are the lower and upper limits of the thrust force that can be provided by each thruster;

$\rho_1 = nT_1 \cos\phi$ is the minimum thrust value available from the thruster(s);

$\rho_2 = nT_2 \cos\phi$ is the maximum thrust value available from the thrusters(s);

$e_i$ is a unit vector of all zeros except the $i^{th}$ row, which is unity; and $\Gamma(t)$ = slack variable that bounds thrust magnitude.

8. The apparatus of claim 7, wherein $$\min_{t_f, T_c(\cdot), \Gamma(\cdot)} \|r(t_f)\|^2$$

subject to the first set of constraints is computed as $$\min_{N, \eta} \|E y_N\|^2,$$

subject to a second set of constraints comprising:

$\|E_u Y_k \eta\| \le e_\sigma^T Y_k \eta$ for $k = 0, \ldots, N$ $$\mu_1(t)\left[1 - (F y_k - z_0(t_k)) + \frac{(F y_k - z_0(t_k))^2}{2}\right] \le$$
$$e_4^T Y_k \eta \le \mu_2(t)[1 - (F y_k - z_0(t_k))]$$

$E y_k \in X$ $k = 1, \ldots, N$ $F y_N \ge \ln m_{dry}$ $y_N^T e_1 = 0, \ E_v y_N^T = 0$ $$y_k = \Phi_k \begin{bmatrix} r_0 \\ \dot{r}_0 \\ \ln m_{wet} \end{bmatrix} + \Lambda_k \begin{bmatrix} g \\ 0 \end{bmatrix} + \Psi_k \eta$$

$k = 1, \ldots, N$ wherein $t_k = k \Delta t, \ k = 0, \ldots, N$ $$\sigma(t) = \frac{\Gamma(t)}{m(t)}$$

$$u(t) = \frac{T_c(t)}{m(t)}$$

$z(t) = \ln m(t)$ $$\eta = \begin{bmatrix} p_0 \\ \vdots \\ p_m \end{bmatrix},$$

wherein $p_j$ is a vector of parameters and $p_j \in \mathbb{R}^4$ $E = [I_{3\times3} \ 0_{3\times1}], F = [0_{1\times6} \ 1], E_u = [I_{3\times3} \ 0_{3\times1}], E_v = [0_{3\times3} \ I_{3\times3} \ 0_{3\times1}]$ $$Y_k \eta = \begin{bmatrix} u(t_k) \\ \sigma(t_k) \end{bmatrix},$$

wherein $u(t_k) =$ is the control input, and $$\sigma(t_k) = \frac{\Gamma(t_k)}{m(t_k)}$$

$\mu_1(t) = \rho_1 e^{-z_0}$, wherein $z_0$ = constant $\mu_2(t) = \rho e^{-z_0}$, wherein $z_0$ = constant $$y_k = \begin{bmatrix} r(t_k) \\ \dot{r}(t_k) \\ z(t_k) \end{bmatrix}$$

$r(t_k)$ is $r(t) t_k$ $\dot{r}(t_k)$ is (t) at $t_k$ $z(t_k)$ is $z(t)$ at $t = t_k$ $e_4^T$ = A transpose of a vector of all zeros except the fourth element, which is unity;

$y_N^T$ = A transpose of $y_k$ at the final time step N $\phi_k, \Lambda_k, \Psi_k, Y_k$ are discrete time state transition matrices describing the solution to $\ddot{r}(t) = u(t) + g$ and $$\dot{z} = \frac{\dot{m}(t)}{m(t)} = -\alpha \sigma(t)$$

wherein g is the acceleration of gravity of the planet or object the spacecraft is landing on.

9. An apparatus for computing a thrust profile to land a spacecraft at or near a surface target, wherein the spacecraft is subject to a non-convex thrust constraint, comprising:

means for computing a minimum landing error descent solution for the spacecraft subject to a convexified non-convex constraint, wherein the descent solution includes a landing error range; and means for determining the thrust profile for the spacecraft subject to the non-convex constraint from the computed minimum landing error descent solution for the spacecraft subject to the convexified non-convex constraint.

10. The apparatus of claim 9, wherein the means for determining the thrust profile for the spacecraft subject to the non-convex constraint from the computed minimum landing error descent solution subject to the convexified non-convex thrust constraint comprises:

means for computing a minimum fuel descent solution for the spacecraft subject to the convexified non-convex constraint and the landing error range; and means for determining the thrust profile for the spacecraft subject to the non-convex constraint from the computed minimum fuel descent solution for the spacecraft subject to the convexified non-convex constraint.

11. The apparatus of claim 10, wherein the means for computing a minimum landing error descent solution for the spacecraft subject to the convexified non-convex thrust constraint comprises means for computing $$\min_{t_f, T_c(\cdot), \Gamma(\cdot)} \|r(t_f)\|^2$$

subject to the first set of constraints comprising the constraints of:

$$\ddot{r}(t) = g + T_c(t)/m(t), \ \dot{m}(t) = -\alpha \Gamma(t)$$

$$\|T_c(t)\| \leq \Gamma(t), \ 0 < \rho_1 \leq \Gamma(t) \leq \rho_2$$

$$r(t) \in X \forall t \in [0, t_f]$$

$$m(0) = m_{wet}, \ m(t_f) \geq m_{dry}$$

$$r(0) = r_0, \ \dot{r}(0) = \dot{r}_0$$

$$r(t_f)^T e_1 = 0, \ \dot{r}(t_f) = 0$$

wherein
r(t) is a position vector of the spacecraft as a function of flight time;
$\dot{r}(t)$ is a velocity vector of the spacecraft as a function of flight time;
$\ddot{r}(t)$ is an acceleration vector of the spacecraft as a function of flight time;
t is the flight time of the spacecraft
t(0) is the time at the beginning of powered landing
$t(f) = t_f$ is the time at the ending of powered landing;
$T_c(t)$ is a net thrust force vector acting on the spacecraft as a function of flight time;
m(t) is a mass of the spacecraft as a function of flight time;
$\dot{m}(t)$ is a mass change of the spacecraft as a function of flight time;
X is the set of feasible positions of the spacecraft;
m(0) is the spacecraft mass at the beginning of the thrust profile;
$m(t_f)$ is the spacecraft mass at the end of the thrust profile;
$m_{dry}$ is the initial mass of the spacecraft without fuel;
$m_{wet}$ is the initial mass of the spacecraft with fuel;

$$\alpha = \frac{1}{I_{sp} g_e \cos \phi},$$

wherein $I_{sp}$ is the specific impulse of the thruster, $g_e$ is the earth's gravitational constant, $T_1$ and $T_2$ are the lower and upper limits of the thrust force that can be provided by each thruster;
$\rho_1 = nT_1 \cos \phi$ is the minimum thrust value available from the thruster(s);
$\rho_2 = nT_2 \cos \phi$ is the maximum thrust value available from the thrusters(s);
$e_i$ is a unit vector of all zeros except the $i^{th}$ row, which is unity; and
$\Gamma(t)$ = slack variable that bounds thrust magnitude.

12. The method of claim 11, wherein $$\min_{t_f, T_c(\cdot), \Gamma(\cdot)} \|r(t_f)\|^2$$

subject to the first set of constraints is computed as $$\min_{N, \eta} \|E y_N\|^2,$$

subject to a second set of constraints comprising:

$$\|E_u Y_k \eta\| \leq e_4^T Y_k \eta \text{ for } k = 0, \ldots, N$$

$$\mu_1(t)\left[1 - (F y_k - z_0(t_k)) + \frac{(F y_k - z_0(t_k))^2}{2}\right] \leq$$

$$e_4^T Y_k \eta \leq \mu_2(t)[1 - (F y_k - z_0(t_k))]$$

$$E y_k \in X \ k = 1, \ldots, N$$

$$F y_N \geq \ln m_{dry}$$

$$y_N^T e_1 = 0, \ E_v y_N^T = 0$$

$$y_k = \Phi_k \begin{bmatrix} r_0 \\ \dot{r}_0 \\ \ln m_{wet} \end{bmatrix} + \Lambda_k \begin{bmatrix} g \\ 0 \end{bmatrix} + \Psi_k \eta$$

$$k = 1, \ldots, N$$

wherein $$t_k = k \Delta t, \ k = 0, \ldots, N$$

$$\sigma(t) = \frac{\Gamma(t)}{m(t)}$$

$$u(t) = \frac{T_c(t)}{m(t)}$$

$$z(t) = \ln m(t)$$

$$\eta = \begin{bmatrix} p_0 \\ \vdots \\ p_m \end{bmatrix},$$

wherein $p_j$ is a vector of parameters and $p_j \in R^4$ $$E = [I_{3\times 3} \ 0_{3\times 1}], F = [0_{1\times 6} \ 1], E_u = [I_{3\times 3} \ 0_{3\times 1}], E_v = [0_{3\times 3} \ I_{3\times 3} \ 0_{3\times 1}]$$

$$Y_k \eta = \begin{bmatrix} u(t_k) \\ \sigma(t_k) \end{bmatrix},$$

wherein $u(t_k)$ = is the control input, and $$\sigma(t_k) = \frac{\Gamma(t_k)}{m(t_k)}$$

$\mu_1(t) = \rho_1 e^{-z_0}$, wherein $z_0$ = constant
$\mu_2(t) = \rho e^{-z_0}$, wherein $z_0$ = constant $$y_k = \begin{bmatrix} r(t_k) \\ \dot{r}(t_k) \\ z(t_k) \end{bmatrix}$$

$r(t_k)$ is $r(t) t_k$
$\dot{r}(t_k)$ is (t) at $t_k$
$z(t_k)$ is z(t) at $t = t_k$ $e_4^T$ = A transpose of a vector of all zeros except the fourth element, which is unity $y_N^T$ = A transpose of $y_k$ at the final time step N $\Phi_k, \Lambda_k, \Psi_k, Y_k$ are discrete time state transition matrices describing the solution to $\ddot{r}(t) = u(t) + g$ and $$\dot{z} = \frac{\dot{m}(t)}{m(t)} = -\alpha\sigma(t)$$

wherein g is the acceleration of gravity of the planet or object the spacecraft is landing on.

* * * * *